(12) United States Patent
Gardiner et al.

(10) Patent No.: US 7,125,145 B2
(45) Date of Patent: Oct. 24, 2006

(54) MULTI-PURPOSE EQUIPMENT

(75) Inventors: Walter A. Gardiner, Warcobuc, NY (US); Joseph A. Hufnagel, Bethel Ct., NY (US); James O. Quinn, Montgomery, NY (US); Peter F. Lynch, Skaneateles, NY (US); Scott W. Osiecki, Skaneateles, NY (US); Robert S. Englert, Skaneateles, NY (US); Nicholas P. Hayduke, Marcelus, NY (US)

(73) Assignee: Taylor Cutlery LLC, Kingsport, TN (US)

( * ) Notice: Subject to any disclaimer, the term of this patent is extended or adjusted under 35 U.S.C. 154(b) by 102 days.

(21) Appl. No.: 10/296,696

(22) PCT Filed: May 29, 2001

(86) PCT No.: PCT/US01/17255

§ 371 (c)(1),
(2), (4) Date: Sep. 8, 2003

(87) PCT Pub. No.: WO01/91978

PCT Pub. Date: Dec. 6, 2001

(65) Prior Publication Data

US 2004/0016058 A1    Jan. 29, 2004

Related U.S. Application Data

(60) Provisional application No. 60/258,095, filed on Dec. 26, 2000, provisional application No. 60/102,172, filed on May 26, 2000.

(51) Int. Cl.
*F21V 26/00* (2006.01)

(52) U.S. Cl. ............... 362/253; 362/362; 362/119; 362/159; 7/164

(58) Field of Classification Search ........... 206/320, 206/701, 722, 223, 301, 373, 234, 38; 362/119, 362/109, 135, 362, 253, 171, 178, 159; 368/10, 368/11, 278; 968/398, 402, 411–413; 7/118–119, 7/163, 167–168, 170, 164
See application file for complete search history.

(56) References Cited

U.S. PATENT DOCUMENTS

| 101,773 A | 4/1870 | Sharp |
| 219,741 A | 9/1879 | Leimer et al. |
| 755,172 A | 3/1904 | Ryan |
| D61,220 S | 7/1922 | Ochse |

(Continued)

FOREIGN PATENT DOCUMENTS

GB    329566    5/1930

(Continued)

OTHER PUBLICATIONS

The Sharper Image Catalog, "Zytool", Aug. 2000, p. 3.

(Continued)

*Primary Examiner*—Sharon E. Payne
(74) *Attorney, Agent, or Firm*—Blank Rome LLP

(57) ABSTRACT

Multi-purpose equipment 10 is disclosed having a modular housing 12, a multi-function module 14 for containing electronic or mechanical devices, a tool pod 16 having multiple tools 106 pivotally attached thereto, an accessory compartment 18 for removably containing, for example, a disposable lighter 32. Module 14 is preferably removable and is adapted contain an electronic or mechanical device, such as a mechanical compass 172, an electronic compass 215, or other electronic devices. Tool pod 16 includes a plurality of pivotally attached tools 106. A lanyard 34 may also be provided to tether module 14 to housing 12.

41 Claims, 17 Drawing Sheets

U.S. PATENT DOCUMENTS

| | | | |
|---|---|---|---|
| 1,530,070 A * | 3/1925 | Ransom | 132/314 |
| 2,075,883 A | 4/1937 | Britsch | |
| 2,234,362 A * | 3/1941 | Bernhardt | 206/86 |
| 2,237,963 A | 4/1941 | Hawks | |
| 2,364,787 A * | 12/1944 | Harrison et al. | 340/321 |
| D158,906 S | 6/1950 | Stalker | |
| 2,572,863 A * | 10/1951 | Jaap | 431/253 |
| 2,828,855 A | 4/1958 | Mosch | |
| 2,992,487 A | 7/1961 | Miller | |
| 3,544,253 A | 12/1970 | Bloom et al. | |
| 3,816,056 A | 6/1974 | Brown | |
| 4,095,348 A | 6/1978 | Kramer | |
| 4,175,333 A | 11/1979 | Kramer | |
| 4,466,283 A | 8/1984 | Osterhout | |
| 4,668,100 A | 5/1987 | Murakami et al. | |
| 4,744,272 A | 5/1988 | Leatherman | |
| 4,783,867 A | 11/1988 | Tsao | |
| D302,102 S | 7/1989 | Amagaya | |
| 4,854,045 A | 8/1989 | Schaub | |
| 5,025,520 A | 6/1991 | Watkins | |
| 5,124,898 A | 6/1992 | Chabria | |
| 5,175,936 A | 1/1993 | Sato | |
| 5,191,792 A | 3/1993 | Gloor | |
| D336,415 S | 6/1993 | Cheng | |
| 5,269,065 A | 12/1993 | Ida | |
| 5,313,376 A | 5/1994 | McIntosh | |
| 5,313,596 A | 5/1994 | Swindler et al. | |
| 5,313,712 A | 5/1994 | Curameng et al. | |
| 5,319,617 A | 6/1994 | Sonoda | |
| D350,271 S | 9/1994 | Landy et al. | |
| D354,237 S | 1/1995 | Ishizaka | |
| 5,412,896 A | 5/1995 | Morgan | |
| 5,430,952 A | 7/1995 | Betts | |
| 5,442,529 A | 8/1995 | Hoover | |
| D369,082 S | 4/1996 | Fells et al. | |
| 5,515,249 A | 5/1996 | Shiao | |
| 5,611,615 A | 3/1997 | Jang | |
| 5,616,903 A | 4/1997 | Springer | |
| 5,617,597 A | 4/1997 | Reitz | |
| 5,738,117 A | 4/1998 | Fontaine, Jr. | |
| 5,781,950 A | 7/1998 | Swinden et al. | |
| 5,790,477 A | 8/1998 | Hauke | |
| 5,791,002 A | 8/1998 | Gardiner et al. | |
| 5,829,965 A | 11/1998 | Rubalcava | |
| 5,857,268 A | 1/1999 | Park | |
| 5,873,648 A | 2/1999 | Shiao | |
| D406,509 S | 3/1999 | Rivera | |
| D407,286 S | 3/1999 | Seber et al. | |
| D407,287 S | 3/1999 | Seber et al. | |
| 5,888,061 A | 3/1999 | Reynolds | |
| D407,616 S | 4/1999 | Seber | |
| 5,916,277 A | 6/1999 | Dallas | |
| D413,504 S | 9/1999 | Kung | |
| 5,960,498 A | 10/1999 | Nabors et al. | |
| 5,963,999 A | 10/1999 | Gardiner et al. | |
| 5,964,131 A | 10/1999 | Seber et al. | |
| 5,971,750 A | 10/1999 | Ho | |
| 5,996,451 A | 12/1999 | Seber et al. | |
| 6,027,224 A | 2/2000 | Schnell | |
| 6,038,723 A | 3/2000 | Nabors et al. | |
| 6,142,769 A * | 11/2000 | Walker | 431/253 |
| 6,144,619 A | 11/2000 | Reisman | |
| 6,145,209 A | 11/2000 | Chang | |
| D435,141 S | 12/2000 | Reynolds | |
| 6,164,814 A * | 12/2000 | Crow | 368/276 |
| 6,185,157 B1 | 2/2001 | Farine | |
| D440,350 S | 4/2001 | Park | |
| 6,273,582 B1 | 8/2001 | Taggart et al. | |
| 6,282,802 B1 * | 9/2001 | Iden | 33/348 |
| D448,685 S | 10/2001 | Gardiner et al. | |
| D449,009 S | 10/2001 | Gardiner et al. | |

FOREIGN PATENT DOCUMENTS

| | | | |
|---|---|---|---|
| JP | 55067864 A * | 5/1980 | |
| JP | 56090279 A * | 7/1981 | |

OTHER PUBLICATIONS

Colibri advertisement in Cigar Aficionado, "All Terrain Lighter", Oct. 2000, p. 98.

WWW.Colibri.com, CX Gear, QTR 9430, QTR 943002, QTR 9410, printed between Jan. 2000 and Jan. 2002, 4 pages.

WWW.Casio.com, ATC1200-IV Forester, printed Feb. 25, 2003, 3 pages.

WWW.Suuntousa.com, Vector, printed Feb. 25, 2003, 10 pages.

* cited by examiner

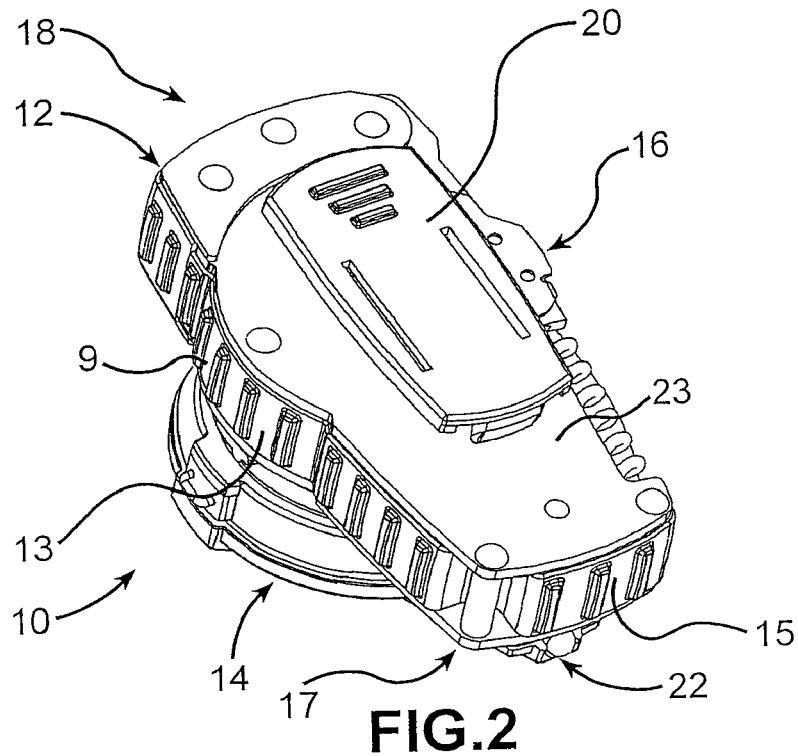
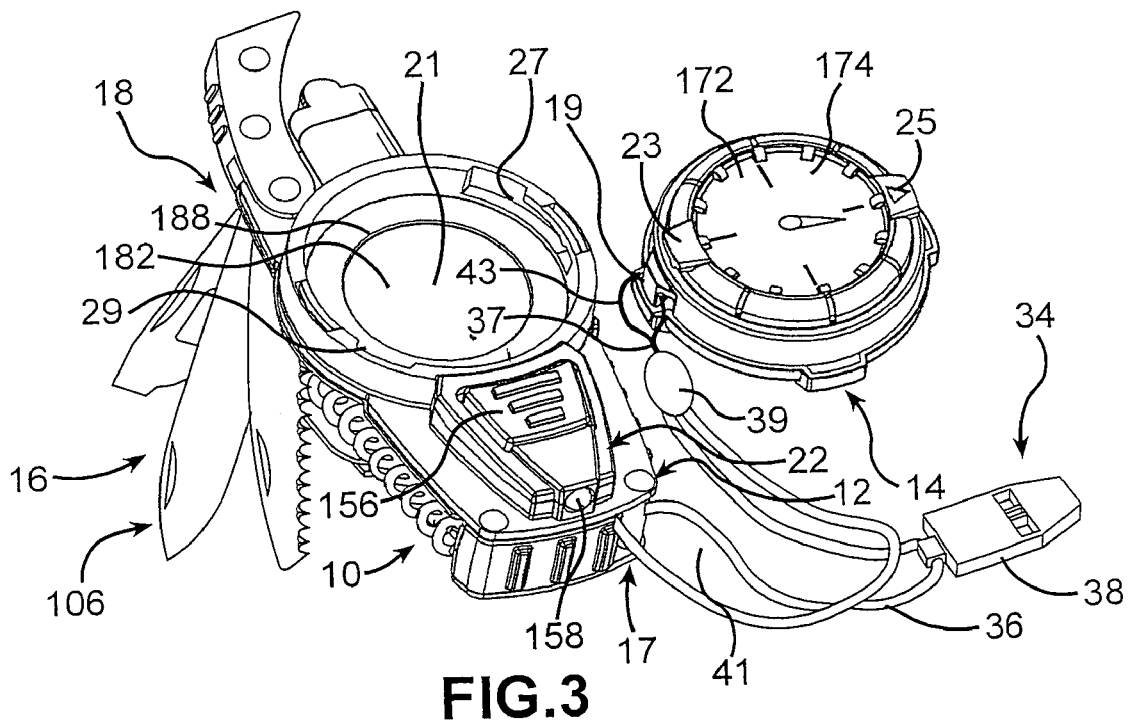

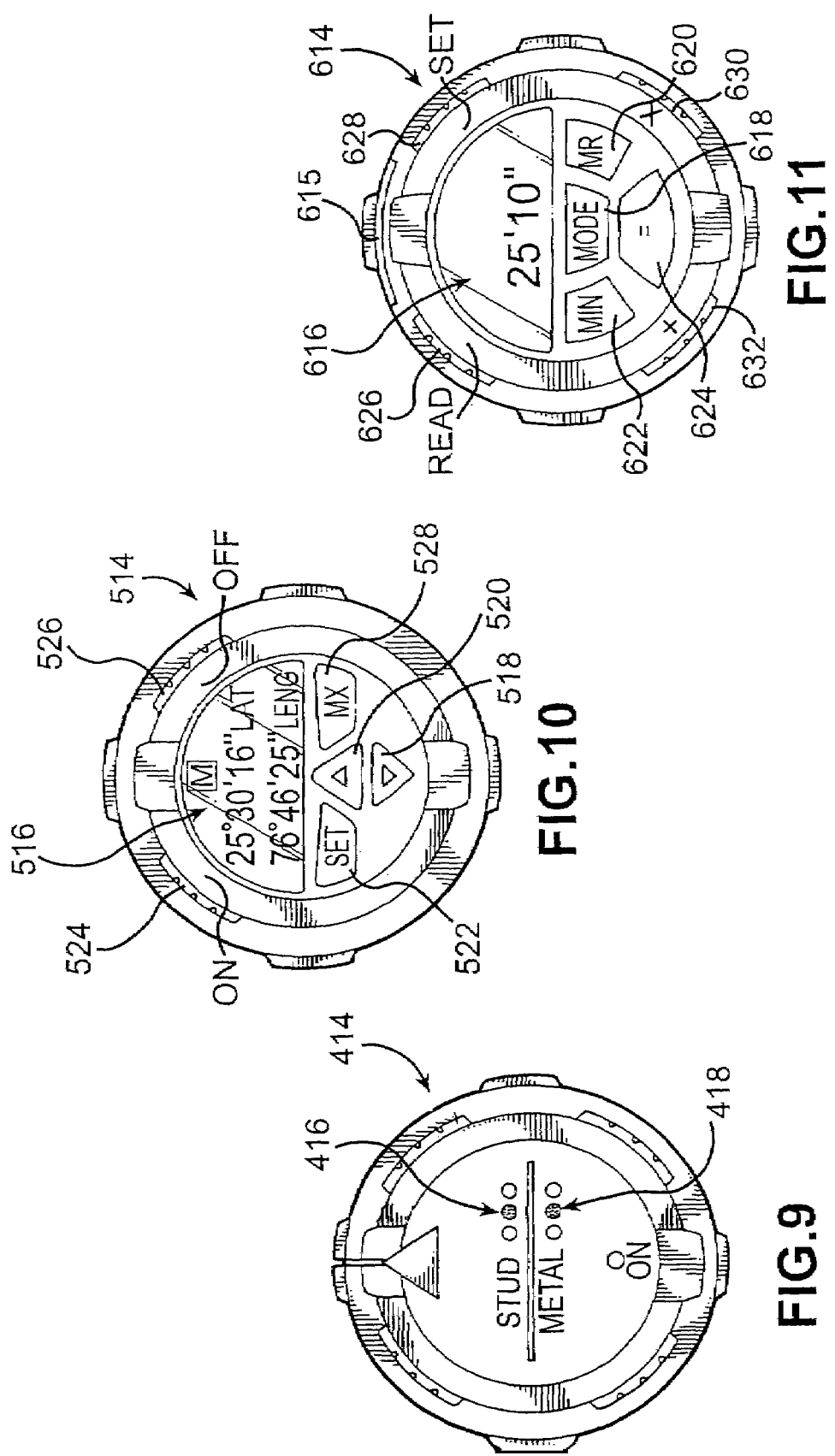

MULTI-PURPOSE EQUIPMENT

CROSS-REFERENCE TO RELATED APPLICATIONS

This application claims priority from U.S. provisional application Ser. No. 60/102,172, filed May 26, 2000, and U.S. provisional application Ser. No. 60/258,095, filed Dec. 26, 2000.

TECHNICAL FIELD

This invention relates to modular multi-purpose equipment comprising a combination of tools, electronic and/or mechanical devices, and other accessories.

BACKGROUND ART

Hand-held tools or devices that can perform multiple functions are not new.

One category of such devices is multi-tools, i.e., pliers in combination with multiple folding tools, such as knife blades, screwdrivers, bottle cap and can openers, and the like. The TOUGH™ tool multi-tool pliers by Imperial Schrade Corp. (disclosed, e.g., in U.S. Pat. No. 5,791,002) and the PST™ multi-tool by Leatherman Tool Group, Inc. (disclosed in U.S. Pat. No. 4,744,272) are representative of the state of the multi-tool art. While quite suitable for the functions that they are designed to perform, these types of tools do not provide sufficient flexibility to integrate non-tool accessories.

Another category of devices known in the art comprises wrist-worn devices that include multiple functions, such as a digital watch, an electronic compass, a barometer, an altimeter, or the like. The Vetor™ wrist-top computer by Suunto (see http:/lwww.suuntousa.com) and the model ATC1200-1V Forester wrist-top computer by Casio (see http://www.casio.com) are representative of the state of the art in this field. The wrist-worn devices of the prior art are deficient in that they do not provide sufficient flexibility to offer electronic functions in combination with other useful devices, such as tools or accessories. In addition, operation of the wrist-worn electronic devices of the prior art is complicated, requiring reliance on a printed manual to access and/or use many of their features.

There have been some efforts in the prior art to provide products that combine some of the functions of a multi-tool with other devices. McIntosh, U.S. Pat. No. 5,313,376, is an example of such efforts. McIntosh discloses a multipurpose pocket knife/light that includes folding tools, a flashlight, a mechanical compass, a temperature gage, a whistle, and a storage compartment. McIntosh is deficient in that its design cannot accommodate a wide variety of combinations and configurations of devices, it is not particularly attractive, and has no electronic device capabilities.

DISCLOSURE OF THE INVENTION

It is a primary object of the present invention to provide multi-purpose equipment that can accommodate tools and a wide variety of other electronic/mechanical devices and accessories in many different combinations in an attractive and easy to use hand-held housing.

It is another object of the present invention to provide a modular housing for multi-function equipment that can be easily and inexpensively modified to accommodate a wide variety of combinations of tools and other devices.

It is yet another object of the present invention to provide a hand-held product having the tools and equipment necessary for a person to survive in remote outdoor environments.

It is a further object of the present invention to provide a multi-function electronic device, the operation of which can be quickly and easily mastered without continued reliance on a printed manual.

In accordance with these and other objects, the present invention comprises multi-purpose equipment including a modular housing, a multi-function module for containing an electronic or mechanical device, a tool pod having multiple tools pivotally attached thereto, and an accessory compartment for removably containing any one of a variety of different accessories, such as a disposable lighter, bandages, a first aid kit, bicycle tire removal tools, a pen or pencil, or coins, for example.

The overall shape of the modular housing is reminiscent of a cellular telephone. The multi-function module is preferably cylindrical and is selectively removable to and from a module-receiving cavity formed on the upper portion of the front face of the housing. The module is preferably tethered to the housing via a lanyard, and the tool pod is located on one side of the housing and preferably includes a plurality of tools pivotally attached to swing out laterally from the housing.

A major feature of the present invention is the removable module which is adapted to contain a mechanical and/or electronic device having the following features, singly or in combination: a mechanical compass, an electronic compass, a global positioning system receiver, a clock, a thermometer, an altimeter, a wireless phone, a stud finder, a tape measure, a beacon, an alarm, a two-way radio, a calculator, a computer, a laser measurement/range finder, a golf scoring card, a tire gauge, and an electronic map. Thus, the multi-purpose equipment of the present invention is designed to be easily and inexpensively modified to support a wide variety of applications.

In alternate embodiments of the invention (particularly versions designed to be less expensive), any one or more of the components of the present invention, such as the tool pod, the flashlight, or the multi-function module could be simplified or even omitted. The invention could include more than one of a particular component, such as the inclusion to two tool pods, for example.

The lanyard according to the present invention preferably includes two looped cords. Both the housing and the multi-function module of the present invention include a lanyard catch, through which one of the lanyard loops may be passed and attached thereto. One of the loops is preferably large enough to allow the multi-function module to pass therethrough, so that the lanyard can be attached to the catches on the housing and module at the same time. This functionality allows the lanyard to be used in multiple configurations: (1) tethered to both catches at the same time; (2) tethered to the catch on the multi-function module only; and (3) tethered to the catch on the housing only. A whistle having an aperture for attachment to one of the cords may also be provided.

One preferred embodiment of the present invention includes a multi-function electronic device having a display, contained within the multi-function module, that includes time and date, alarm, stopwatch, compass, altimeter, barometer and a thermometer functions (or modes). Four buttons are preferably provided for displaying and using the available functions. In accordance with the present invention, the multi-function electronic device is programmed so that a user of the device, after learning the operation of any one mode, can operate the device without the use of a printed manual. This is accomplished, in part, by programming the device so that any feature can be accessed by pressing no more than one button at a single time. These features are important to the present invention because it is likely to be used in outdoor environments where reliance on a printed manual is undesirable or may even be impossible.

The housing of the present invention is specifically designed for easy and inexpensive modification at the manufacturing level. The primary structural components of the housing comprise a spacer sandwiched between front and rear plates. The multi-function module is retained by a module-receiving cavity attached to the front plate. The spacer defines the shape and thickness of the accessory compartment and the tool pod. At the manufacturing level, changing the thickness or configuration of the accessory compartment and/or the tool pod is a simple matter of using a differently sized spacer.

BRIEF DESCRIPTION OF THE DRAWINGS

The features and advantages of the present invention will be more fully appreciated as the same becomes better understood from the following detailed description of the preferred embodiments when considered in connection with the accompanying drawings, in which:

FIG. 2 is a rear perspective view thereof;

FIG. 3 is a front perspective view thereof, shown with the module removed, with the lanyard attached to both the housing and the module, and some of the tools partially unfolded;

FIG. 9 is a front view of a stud finder module, an alternative embodiment of the multi-function module;

FIG. 10 is a front view of a global positioning system receiver module, another alternative embodiment of the multi-function module;

FIG. 11 is a front view of a combination range finder and calculator module, another alternative embodiment of the multi-function module;

PREFERRED MODES FOR CARRYING OUT THE INVENTION

Figure 1:
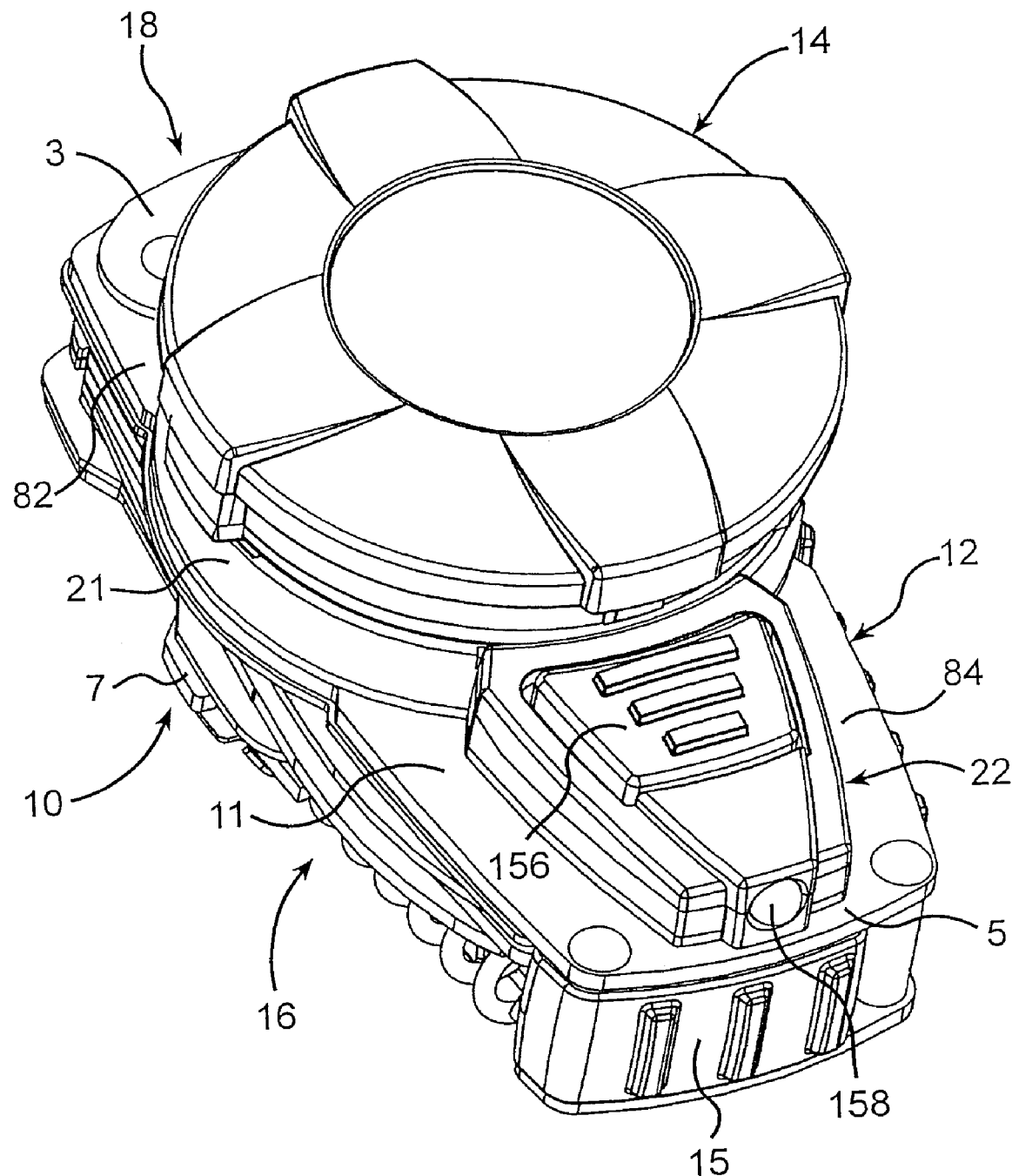
FIG. 1 is a front perspective view of a preferred embodiment of the present invention.

Referring now to the drawings, and particularly to FIGS. 1–2, reference numeral 10 generally refers to a preferred embodiment of the multi-purpose equipment of the present invention. Equipment 10 comprises a housing 12 and a multi-function module 14 positioned on the housing.

As will be appreciated, the structure of housing 12 is substantially identical for all embodiments discussed herein. However, multi-function module 14 may differ according to the particular function desired.

For example, module 14 may contain a mechanical or analog device, such as a mechanical compass (as shown in FIGS. 1–3), as will be explained in greater detail hereinafter.

Housing 12 has an attractive appearance, somewhat reminiscent of a cellular telephone. It includes a front face 11, a back face 23, a top 3, a bottom 5, and sides 7 and 9. Sides 7 and 9 are preferably tapered inwardly from top 3 to bottom 5. Front face 11 includes an upper portion 82 and a lower portion 84.

In accordance with the preferred embodiment, module 14 is substantially cylindrical in shape and fits within a substantially cylindrical module-receiving cavity 21 (see FIG. 3) located on upper portion 82 of front face 11. It may be appreciated that module 14 is centrally and prominently located on a major portion of front face 11 of housing 12. In addition, as will become more clear hereinafter, module 14 is removable by hand, as may be desired by the user, from module-receiving cavity 21. When module 14 is in place within module-receiving cavity 21, as shown in FIG. 1, the display screen of the electronic or mechanical device housed in module 14 (not shown in this view) is protected since it is face down.

As will be described in greater detail herein, equipment 10 is designed to provide and house multiple devices, tools and accessories in a compact assembly that can be hand-held and stored safely in a coat or pants pocket, in a bag, or clipped to a person's belt.

For example, extending from one side 7 of housing 12 is a tool pod 16 having a plurality of tools 106 (e.g., knife, can opener, scissors, etc.) pivotally mounted therein. The details of tool pod 16 will be described in greater detail hereinafter.

Located in lower portion 84 of front face 11 is a flashlight 22 which preferably comprises an LED 158 and a button 156 for actuating the LED 158.

Figure 4:
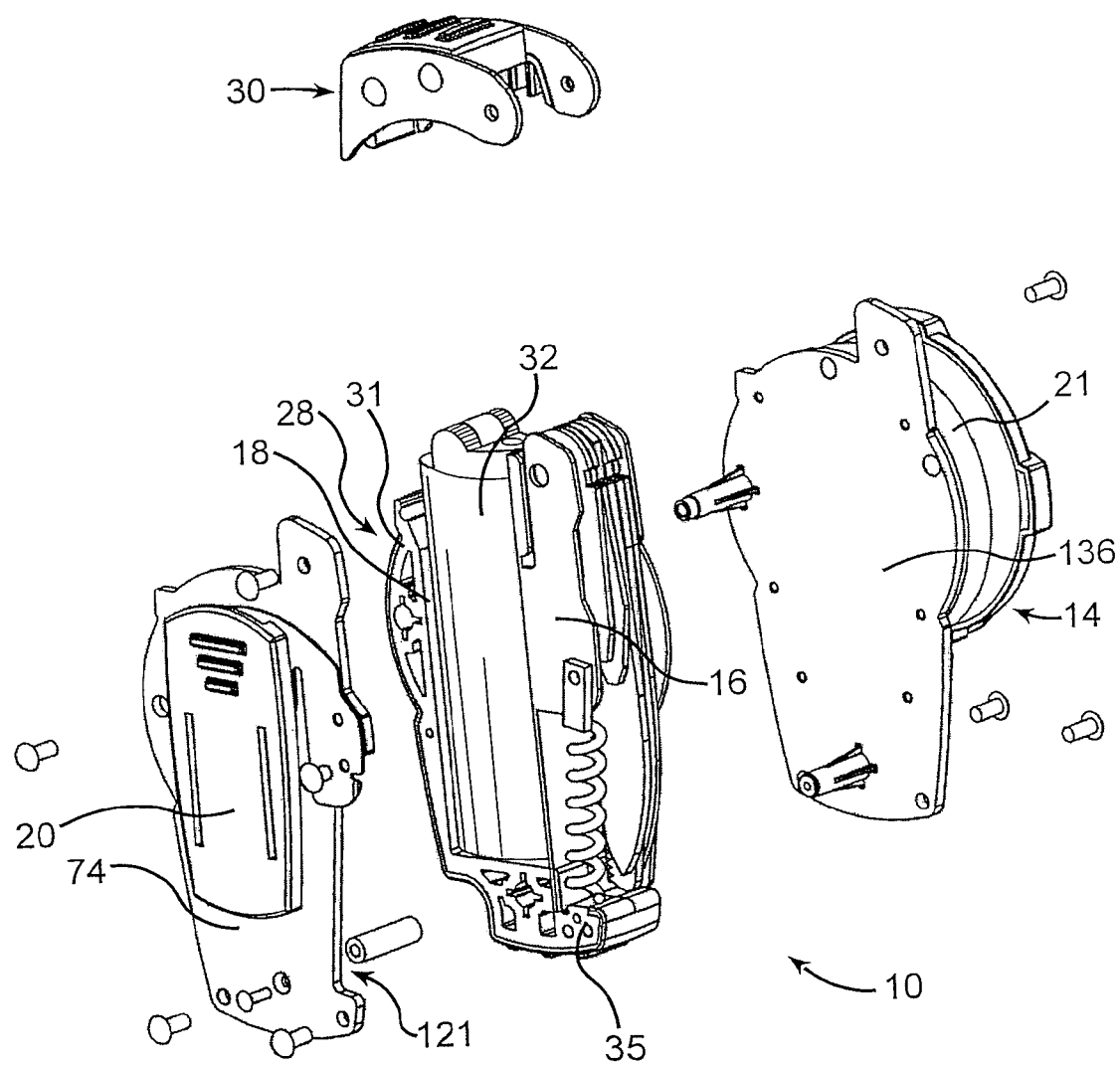
FIG. 4 is an exploded rear perspective view thereof.

Centrally located and accessible from the top 3 of housing 12 is a longitudinally formed accessory compartment 18 that is designed to accommodate disposable lighter 32 (see FIG. 4).

On rear face 23 of housing 12 is a belt clip 20 to permit the entire unit to be easily mounted on one's belt.

In accordance with an important aspect of the present invention, the modular design of equipment 10 allows it to be easily and inexpensively modified at the manufacturing level to support a wide variety of applications. For example, multi-function module 14 could be adapted contain a mechanical compass, a electronic compass, a global positioning system receiver, a clock, a thermometer, an altimeter, a wireless phone, a stud finder, a tape measure, a beacon, an alarm, a two-way radio, a calculator, a computer, a laser measurement/range finder, a golf scoring card, a tire gauge, and an electronic map. Some of these embodiments will be discussed in greater detail hereinafter. Tool pod 16 could easily be modified to include different groups of tools. Accessory compartment 18 could shaped to accommodate a variety of accessories, both removable and fixed. In less expensive models, any one or more of the components of equipment 10, such as tool pod 16, flashlight 22, or multi-function module 14 could even be omitted.

As the foregoing demonstrates, housing 12 and module 14 serve as the basic foundation for a wide variety of applications.

Mechanical Compass Embodiment

A preferred embodiment wherein multi-function module 14 houses a mechanical or analog compass is illustrated in FIGS. 1–4 and will now be described.

Metal contained within housing 12 may result in inaccurate readings from a device, such as a mechanical compass, that may be contained within multi-function module 14. Therefore, multi-function module 14 is designed to be removable from housing 12. Housing 12 includes a module cavity 21 (FIG. 3) in which multi-function module 14 is stowed when not in use as shown in FIGS. 1 and 2. As shown in FIG. 4, module 14 is secured to module cavity 21 by means of two flanges 23 and 25 which are inserted and rotated into bayonet slots 27 and 29, respectively, that are formed on the rim of cavity 21.

As shown in FIG. 3, a mechanical compass 172 having an outwardly facing display 174 is contained within module 14. Display 174 can be viewed when module 14 is removed from module cavity 21 and inverted. When module 14 is stowed in cavity 21, display 174 is enclosed between module cavity 21 and module 16, and is therefore protected from damage.

Referring now to FIG. 3, flashlight 22 preferably includes a rubberized button 156 that, when depressed, activates an LED 158. Of course other light-emitting devices, such as incandescent bulbs, could be substituted for LED 158. LED 158 is preferred, however, because of its combination of low power consumption and intensity. LED 158 is powered by a 3 volt dry cell battery 182, which is removably secured to a battery housing 188 located in multi-function module cavity 21.

A lanyard 34 (see FIG. 3) may be provided to prevent multi-function module 14 from becoming lost. Lanyard 34 includes two cords 36 & 37, which are both fastened to a retainer 39, forming loops 41 & 43 in cords 36 & 37, respectively. Cords 36 & 37 are formed of woven nylon but could, alternatively, be formed of any suitable material. Retainer 39 is preferably formed of flexible plastic or rubber. Two lanyard catches 17 (FIG. 2) & 19 (FIG. 3) are provided on housing 12 and module 14, respectively, for attaching lanyard 34. Loop 41 is preferably large enough to allow module 14 to pass therethrough, so that lanyard 34 can be attached to both catch 17 and catch 19 at the same time. This feature allows lanyard 34 to be used in multiple configurations:

tethered to both catches 17 & 19 at the same time, thereby tethering module 14 to housing 12 (see FIG. 3);
tethered to catch 17 only; or
tethered to catch 19 only.

Optionally, a whistle 38 having an aperture 45 for attaching whistle 38 to cord 36 or 37 may also be provided.

FIG. 4 shows an exploded view of equipment 10 for the purpose of showing the shape and relationship of the internal parts of housing 12 and describing the modular construction of housing 12. Tool pod 16 and accessory compartment 18 are sandwiched between a front plate 136 and a back plate 74, which are separated by spacer 28.

Spacer 28 is roughly L-shaped, including a wall 31 and a floor 35 that is orthogonal to wall 31. Spacer 28 accommodates tool pod 16 atop floor 35. Wall 31, floor 35, tool pod 16 front plate 136, and back plate 74 define the bounds of accessory compartment 18. Preferably, wall 31 and floor 35 each respectively include a gripping surface 13 and 15 (see FIGS. 1 and 2) that helps the user to grip equipment 10 when held in his or her hand.

Accessory compartment 18 can be used to accommodate a number of different items. In this embodiment, compartment 18 removably receives a conventional disposable lighter 32 (such as a Bic® or Scripto® brand disposable lighter). When equipment 10 is fully assembled, compartment 18 is formed by spacer 28, front plate 136, back plate 74, and equipment pod 16. A lid 30 covers compartment 18 and lighter 32 (when stored therein) and can be flipped upwardly to remove or replace lighter 32. When contained within compartment 18, lighter 32 is protected from moisture and damage.

In the embodiment shown in FIG. 4, lighter 32 is designed to be removable in order to keep flames and heat away from equipment 10 and to allow for easy and inexpensive replacement of lighter 32. Alternatively, a refillable built-in lighter (not shown) could be provided.

Figure 5:
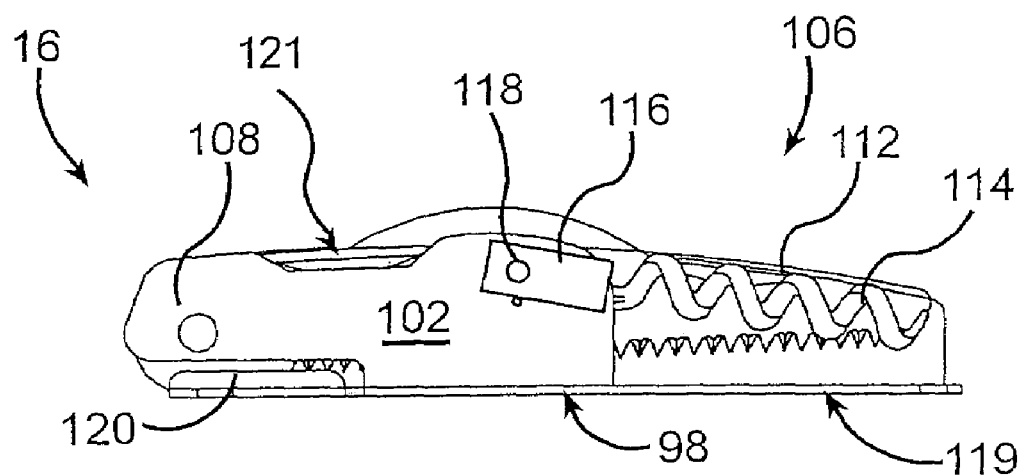
FIG. 5 is an enlarged left side view of a tool pod.
Figure 6:
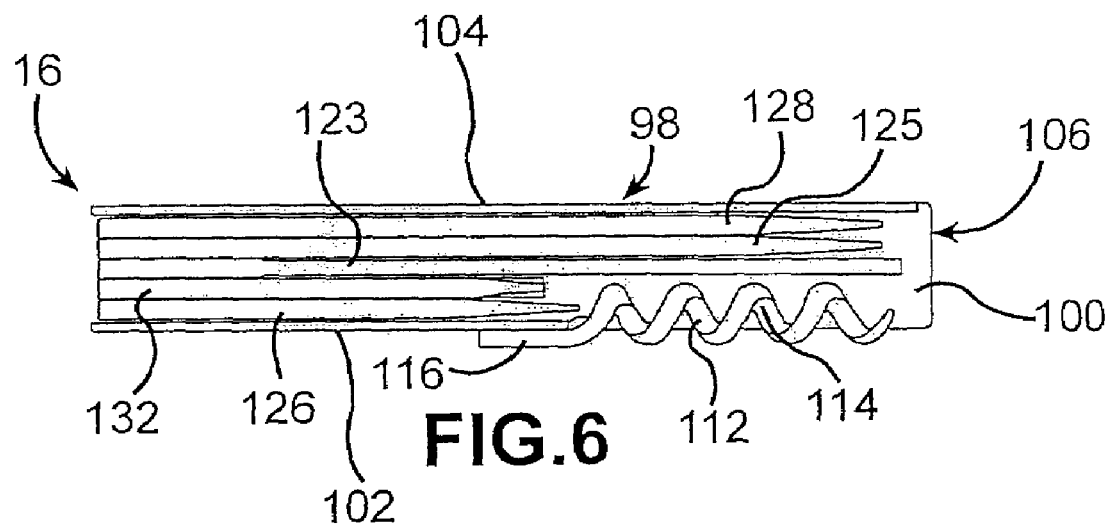
FIG. 6 is an enlarged top view thereof.

Tool pod 16 is affixed within spacer 28 and includes a plurality of tools 106 (see FIGS. 5–6). Tools 106 pivot approximately 180 degrees from the stowed position (shown in FIGS. 4–6) to a fully extended and locked position (not shown).

Referring now to FIGS. 5–6, tool pod 16 in a preferred embodiment includes a housing 98 having a planar floor 100 and two opposing upright walls 102 and 104, between which tools 106 are stowed. The pivoting and locking features of tool pod 16, including tool lock 120 (including a leaf spring and a transverse slot), are similar in structure and operation to the pivoting and locking features used in the TOUGH™ tool multi-function pliers, manufactured by the Imperial Schrade Corp., and therefore, will not be described in detail herein. Such features are set forth in U.S. Pat. No. 5,781,950 the disclosure of which is specifically incorporated herein by reference.

Tools 106 may comprise many different combinations of implements, all of which are well-known in the art. Examples of such tools could include: a knife blade 128, a pair of scissors 125, a saw blade 123, a combination cap-opener/Phillips-head screwdriver 132, and a combination can opener/flat-head screwdriver 126. Such tools are intended to be merely exemplary of the wide variety of tools that could be included as part of tool pod 16.

Tool pod 16 also preferably includes a corkscrew 112 having a worm 114 welded to an arm 116, which is pivotally attached to the exterior side of wall 102. Corkscrew 112 is pivoted 90 degrees counter-clockwise for use.

Recessed portions 119 and 121, formed in wall 102 and back plate 74 (see FIG. 4) allow for easy access to tools 106 and corkscrew 112.

Returning now to FIG. 4, front plate 136 and back plate 74 are formed of metal, for durability, but obviously could be formed of any durable material. A belt clip 20 is preferably provided and attached to the rear of back plate 74 to allow equipment 10 to be secured to the belt of a person carrying equipment 10. Clip 20 is preferably made of high-impact plastic which may be color coordinated with other parts of equipment 10. Clip 20 may be affixed to back plate 74 by any convenient means, such as rivets of adhesives. Module cavity 21 is preferably affixed to front plate 136.

As discussed above, the modularity of housing 12 provides significantly more flexibility at the manufacturing level than equipment of the prior art. Modification of housing 12 to accommodate tool pods of different widths, a differently-shaped accessory compartment, or omission of either of these parts is simply a matter of substituting a spacer of a different width and/or shape. Other modifications could include the omission of module cavity 21 and multi-function module 14.

Electronic Compass Embodiment

Figure 7:
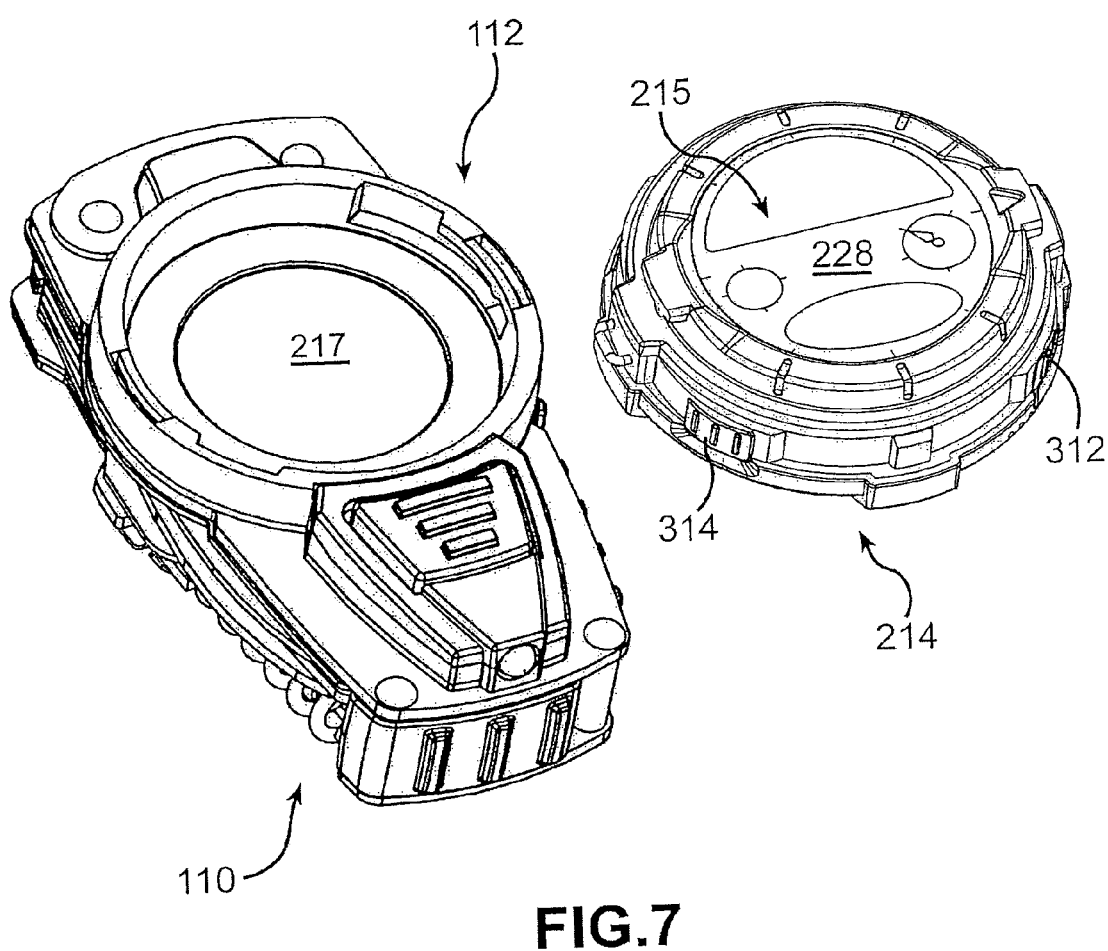
FIG. 7 is a front perspective view of a second embodiment of the present invention, shown with the module removed.
Figure 7A:
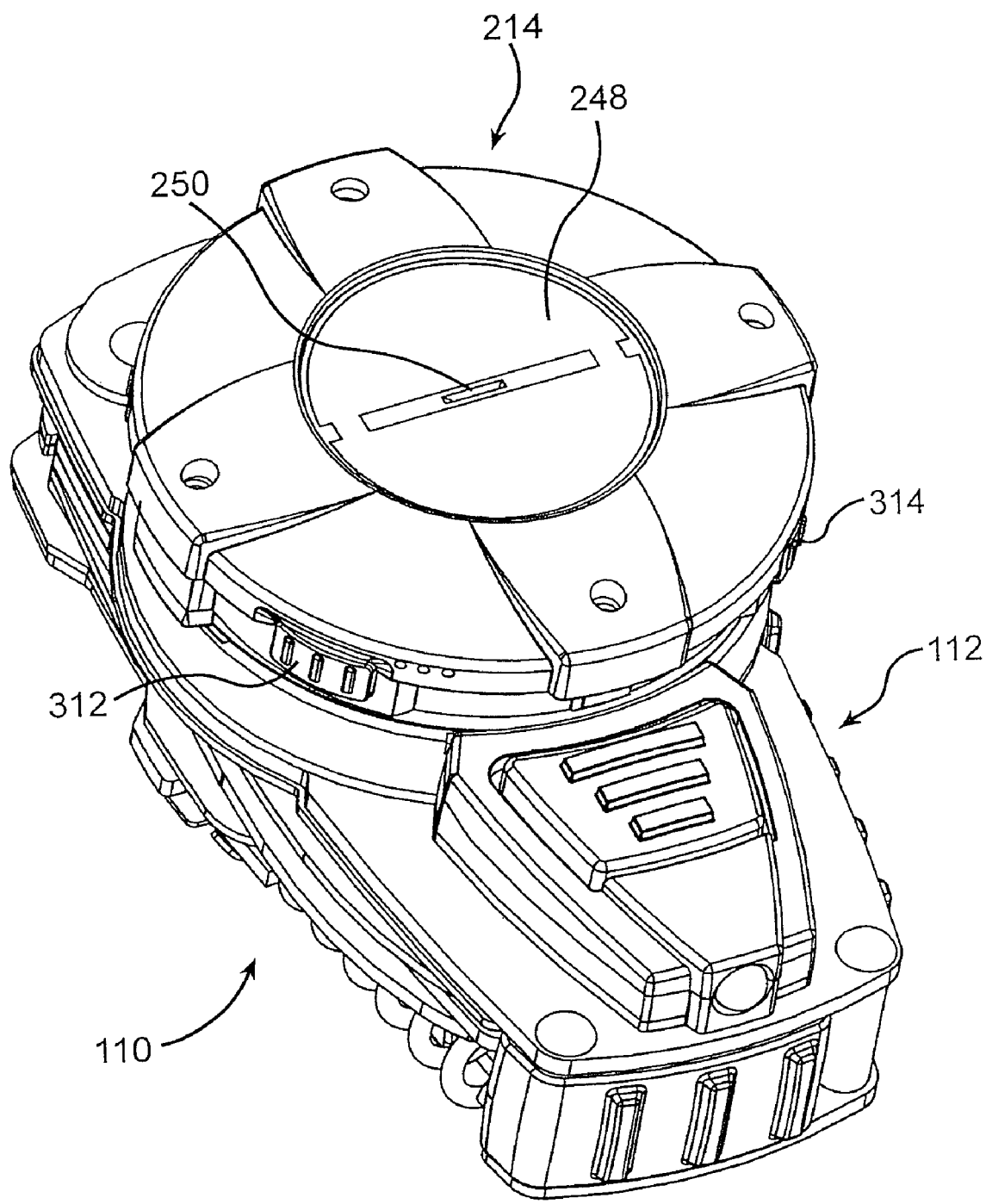
FIG. 7A is a front perspective view of a second embodiment of the present invention.

Referring now to FIGS. 7 & 7A, equipment 110 is shown with an alternative multi-function module 214. The structure of housing 112 is substantially the same, if not identical, to the housing 12 of the mechanical compass embodiment described in detail above. Multi-function module 214 comprises an electronic compass 215 that includes the capability of displaying a variety of information, including time, date, stopwatch, temperature, direction, absolute and relative barometric pressure, and altitude above sea level. Module 214 may optionally include a signal mirror 217 incorporated into housing 112 which is formed of a reflective material, such as polished steel.

Figure 14:
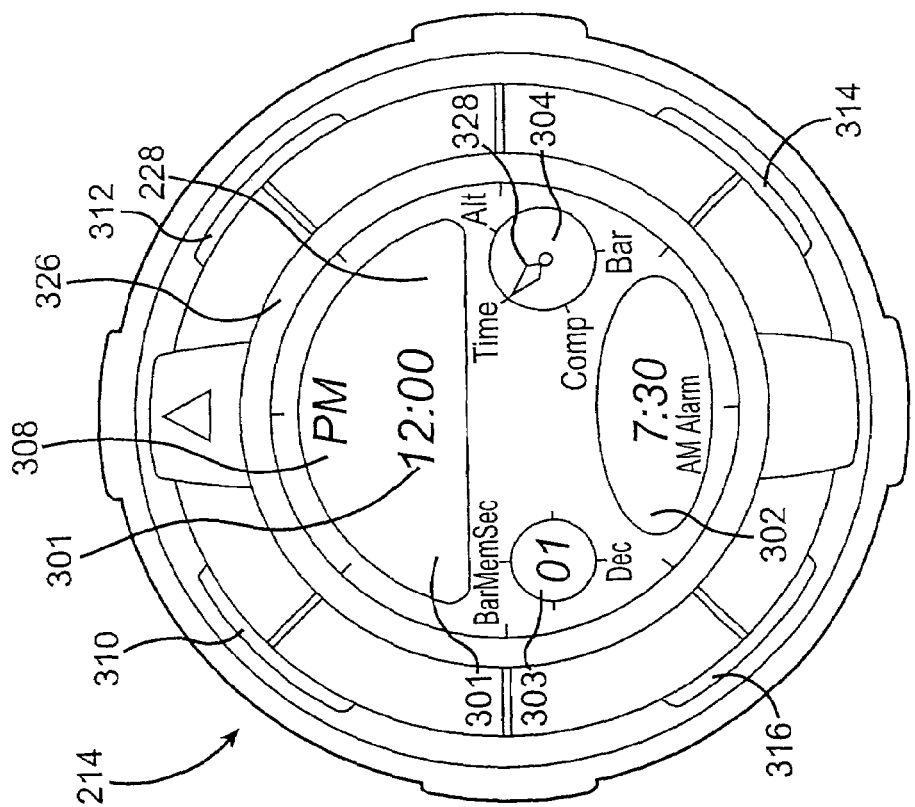
FIG. 14 is a front view of a preferred embodiment of the LCD face of the multi-function module, shown in default mode, displaying time and alarm.

Compass 215 is operated by four buttons 310, 312, 314, and 316 (see FIG. 14—only buttons 312 & 314 are visible in FIGS. 7 & 7A). As will be described in greater detail herein, the functions and operation of electronic compass 215 represents a marked improvement over similar devices in the prior art. The primary components of electronic compass 215 comprise a liquid crystal display (LCD) 228 and a printed circuit board (PCB) 232 (see FIG. 8).

LCD 228 is a conventional backlit, disk-shaped display commonly used in wristwatches. In this embodiment, the backlight color is preferably selected to be amber (orange) in order to provide optimum visibility at night. Of course other backlight colors, such as red or green, for example, could be used.

Figure 8:
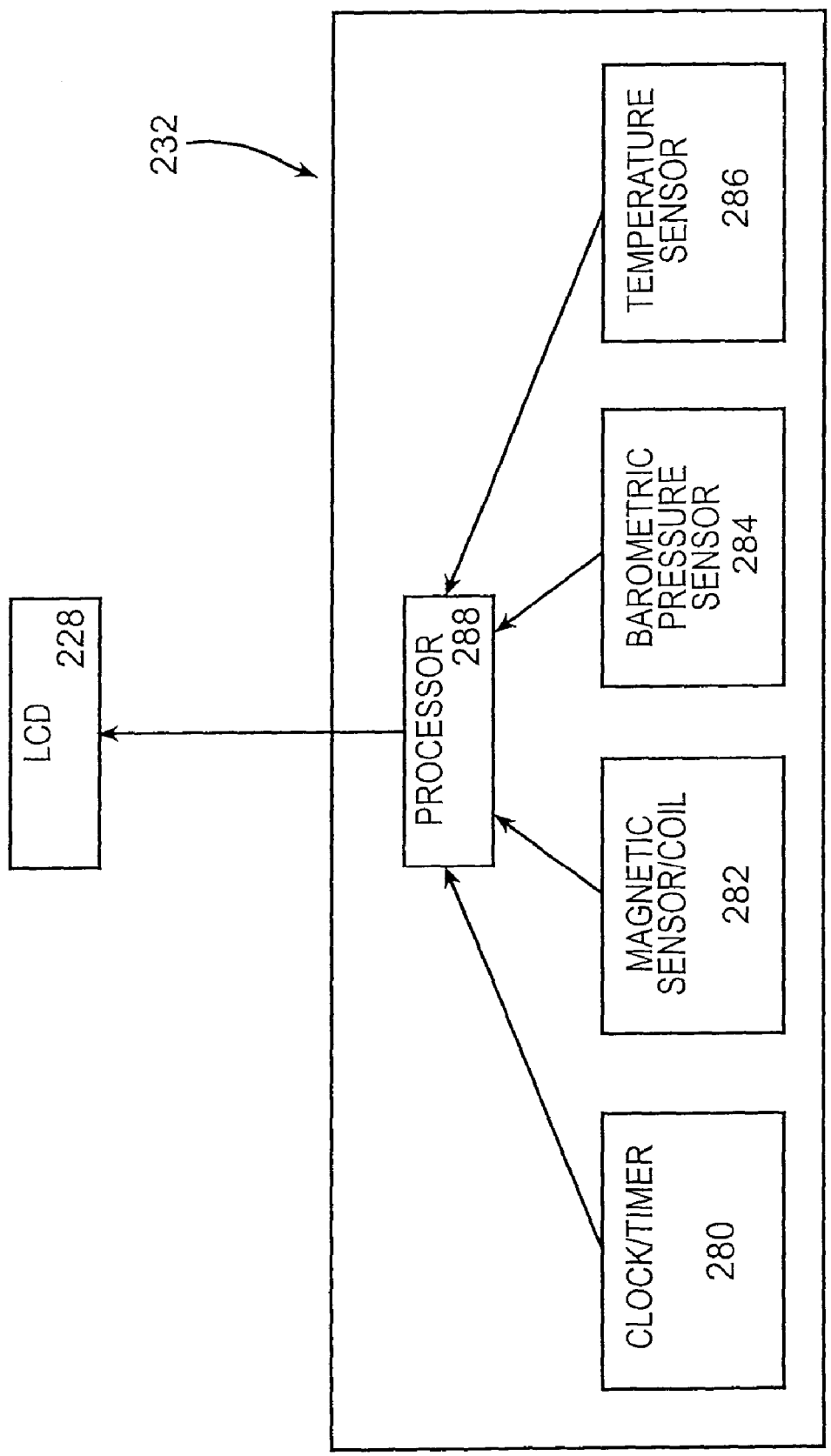
FIG. 8 is a schematic block diagram of a preferred embodiment of the printed circuit board of the module.

A block diagram showing the basic structure of PCB 232 is shown in FIG. 8. PCB 232 includes several modules that provide the information described above. Time, date and stopwatch information is generated in clock/timer module 280. Directional information (compass) is provided by a magnetic sensor/coil module 282. Barometric pressure information is provided by a pressure sensor module 284. Temperature is provided by an electronic temperature sensor module 286. Modules 280, 282, 284 and 286 are all readily-available electronic components. Modules 280, 282, 284, and 286 each send information to processor 288 that converts the information from each module and displays it on LCD 228. Processor 288 also changes the information displayed on LCD 228 in response to inputs from buttons 310, 312, 314, and 316 (see FIG. 14).

Referring back to FIG. 7A, power for PCB 232 and LCD 228 is preferably provided by a 3 volt dry cell battery (not shown) that is removably secured within module 214 by a threaded cover 248. An o-ring may be provided between the battery and cover 248 to seal out moisture. Cover 248 is opened and closed by means of a generally rectangular slot 250, which can be opened with a coin or flat head screwdriver, for example.

Multi-function module 214 may optionally include a small dish-shaped bubble level (not shown), which would preferably be embedded in compass 215. The inclusion of a bubble level would aid in the calibration of electronic compass 215 in altimeter mode, which will be discussed in detail herein, as well as improving the accuracy of compass 215 in compass mode.

Alternative Multi-Function Module Embodiments

Figure 13:
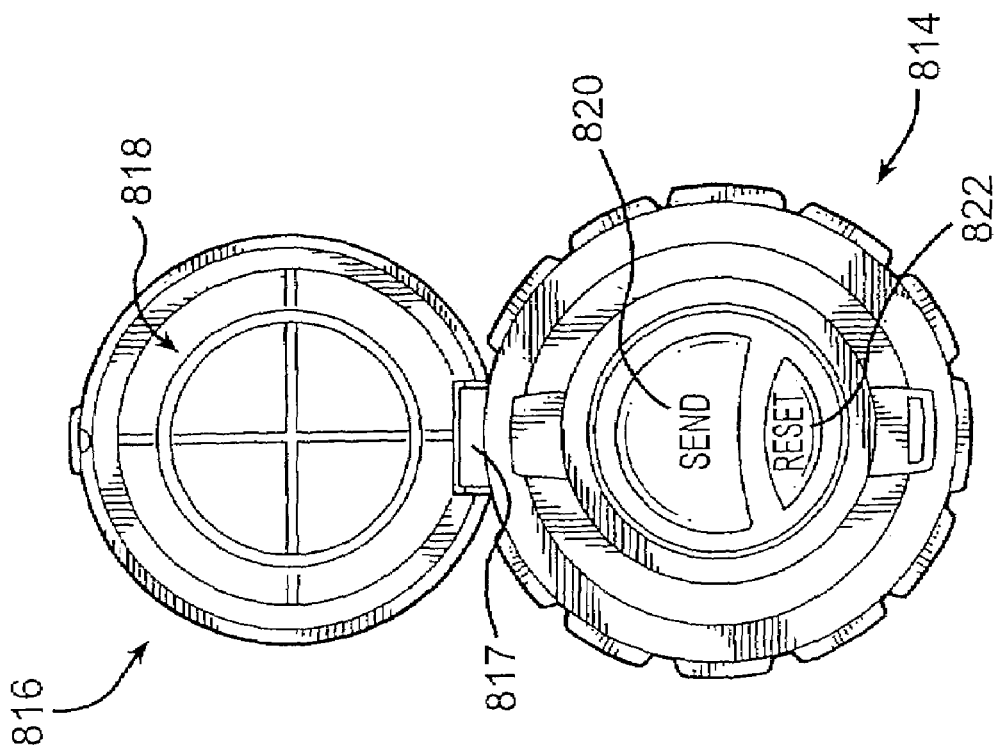
FIG. 13 is a front view of a radio transmitter/transponder module, another alternative embodiment of the multi-function module.
Figure 12:
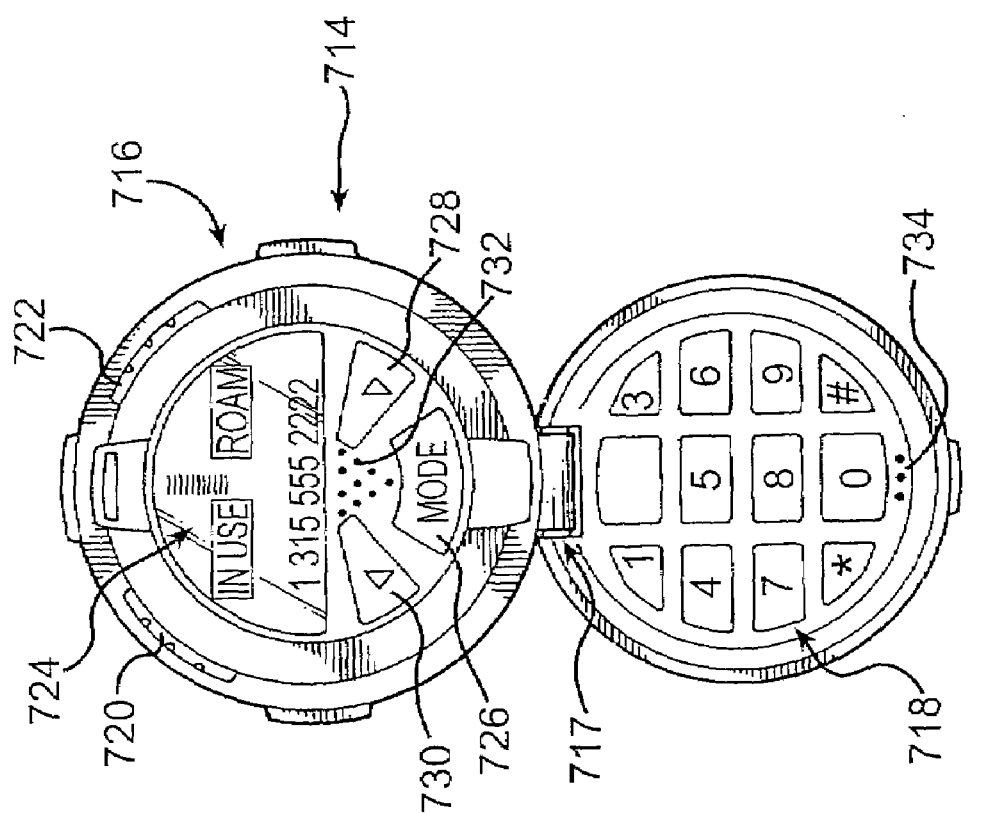
FIG. 12 is a front view of a wireless telephone module, another alternative embodiment of the multi-function module.
Figure 15:
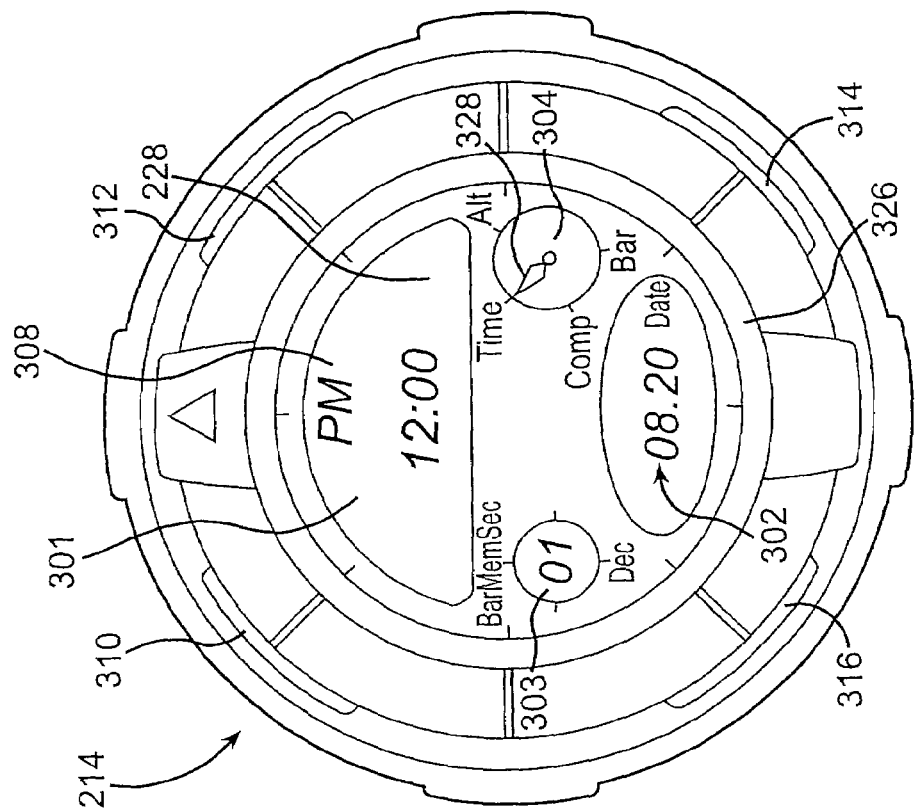
FIG. 15 is a front view of the LCD face of the multi-function module, shown in default mode, displaying time and date.

As noted above, multi-function modules 14 and 214 comprising mechanical (analog) and electronic (digital) compasses, respectively, represent only two examples of the many possible devices that may be included as part of equipment 10 of the present invention. Other possibilities include fir example, a stud finder module 414 (FIG. 9), a global positioning system ("GPS") module 514 (FIG. 10), a range finder and calculator module 614 (FIG. 11), a wireless phone module 714 (FIG. 12), and a radio transmitter/transponder module 814 (FIG. 13).

Stud finder module 414 (FIG. 9) could include sensors (not shown) to detect both metal and wood (density) that would be displayed by indicator lights 416 and 418, respectively.

GPS module 514 (FIG. 10) provides current position information, such as latitude and longitude, which is displayed on an LCD 516. Two buttons 518 and 520 would ☐allow the user to cycle up and down through display modes. A set button 522 acts to store the current position in memory. A memory recall button 528 displays waypoints stored in memory. Buttons 524 and 526 respectively turn module 514 on and off.

Range finder/calculator module 614 (FIG. 11) provides information regarding the distance between module 614 and an object or surface, as well as calculator functions. Such information is displayed on an LCD 616. Module 614 includes front-mounted sensor 615 which may include a laser light (not shown) to identify the surface to which distance is being measured. A mode button 618 allows the user to switch from English to metric units in range finder mode and to switch between range finder mode and calculator mode. A read button 626 causes the current distance to be fixed on LCD 616. A set button 628 is used to calibrate sensor 615. A memory input button 622 stores distance readings or calculated numbers in memory. A memory recall button 620 recalls numbers stored in memory. Two operation buttons 632, 630 provide addition and multiplication functions. An "equals" button 624 displays the results of an addition or multiplication operation.

Wireless phone module 714 (FIG. 12) is laid out and functions much like a conventional flip-type cellular telephone. Module 714 includes an LCD 724, keypad 718, buttons 720 and 722 for respectively initiating/answering and terminating a call, buttons 728 and 730 for scrolling through stored telephone numbers, and button 726 for scrolling through the various modes provided by module 714. Such modes could include, for example, an electronic phone book, a log of incoming and outgoing calls, options, and other features commonly found on conventional wireless telephones. Since phone module 714 is laid out and functions much like a conventional flip-type cellular telephone it further includes holes 732 above a receiver and holes 734 above a transmitter.

Radio transponder/transmitter module 814 (FIG. 13) includes an antenna 818 contained within a lid 816 that pivots about a hinge 817. Module 814 preferably includes a send button 820 for sending a beacon or distress signal and a reset button 822. Module 814 is targeted for use in a marine environment.

As is the case with multi-function modules 14 and 214, several of the above-noted modules, for example, range finder and calculator module 614, are preferably designed to be removable from housing 12. However, other modules, such as wireless phone module 714, need not be removable, and therefore, could be permanently attached to housing 14 and would include therefore a hinged lid 716 with hinge 717 which provides access to the functional features of module 714. Such multi-function module embodiments could otherwise □resemble the embodiments shown in FIGS. 1–7.

Layout and Operation of the Electronic Compass

Having discussed additional alternative multi-function modules, attention is now returned to the electronic compass embodiment for a more detailed discussion of its operation, which represents a significant improvement over the wrist-top computers of the prior art in the simplicity of its use.

Referring now to FIG. 14, the layout of LCD face 308 is designed to allow the user to quickly recognize and use the information displayed thereon. As will be described in greater detail herein, four buttons 310, 312, 314 and 316 are provided to allow the user to navigate through the numerous functions available. Information relating to such functions is displayed in one of four display zones 301, 302, 303, and 304, as well as a direction ring 326.

LCD 228 includes four modes: time and date, compass, altitude, and barometer. Each general mode includes several functions or display sub-modes (which will be described in detail herein), each displaying different information in at least one of zones 301, 302, 303 and 304.

Figure 23:
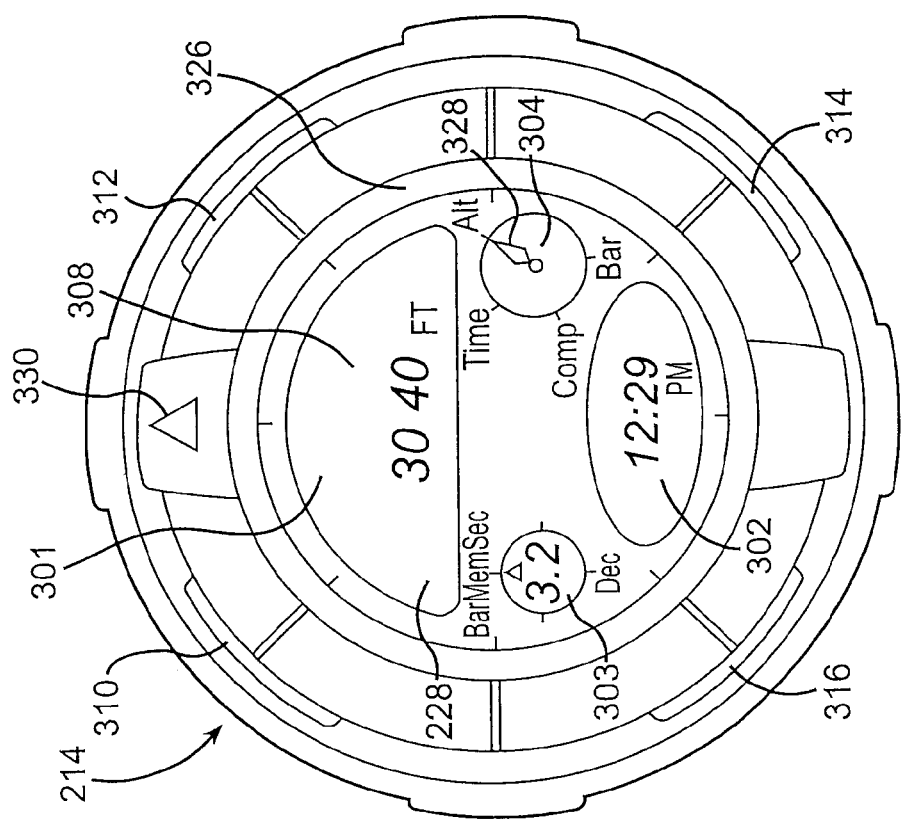
FIG. 23 is a front view of the LCD face of the multi-function module, shown in altitude mode, displaying altitude, rate of ascent/descent and time.

The active mode (i.e., the mode being displayed on face 308) is indicated by an arrow 328, which is located in zone 304 and points to text corresponding to the active mode. Cycling from mode to mode is accomplished by depressing pressing mode button 312. For example, compass 220 may be cycled from time mode (as shown in FIG. 14) to altitude mode (as shown in FIG. 23) by depressing mode button 312 twice. The operation of compass 220 will now be described in detail:

Time Mode

FIGS. 14–19 show face 308 in time mode. In time mode, face 308 displays time and date information, as shown in FIG. 14. When time mode is selected, the following information appears on face 308:

| | |
|---|---|
| Zone 301: | displays the current time in either 12 or 24-hour format (with AM and PM indication when in 12-hour format) |
| Zone 302: | display cycles between date sub-display, year sub-display, or alarm time sub-display |
| Zone 303: | displays seconds |

Compass 220 is operated as follows when LCD 280 is in time mode:

- depressing select/set button 314 cycles through alarm, year and date sub-displays
- depressing button 310 continuously for 2 seconds activates a stopwatch function (described below)
- depressing button 310 briefly toggles between 12 and 24-hour time mode
- depressing pressing button 316 once activates an alarm set function (described below)
- depressing pressing button 316 continuously for 2 seconds activates a backlight (not shown) for 10 seconds
- depressing and holding select/set button 314 for 3 seconds activates a clock set function (described below)

Face 308 displays the following information in zone 302 when in time mode:

| | |
|---|---|
| Date display sub-mode: | displays the month and date in mm.ddformat and the word "Date" (see FIG. 15) |
| Year display sub-mode: | displays the year in yyyy format and the word "Year" (see FIG. 16) |
| Alarm display sub-mode: | alarm time in hh.mm format and the word "Alarm" and "AM" or "PM" if in 12-hour time mode (see FIG. 17). |

Figure 17:
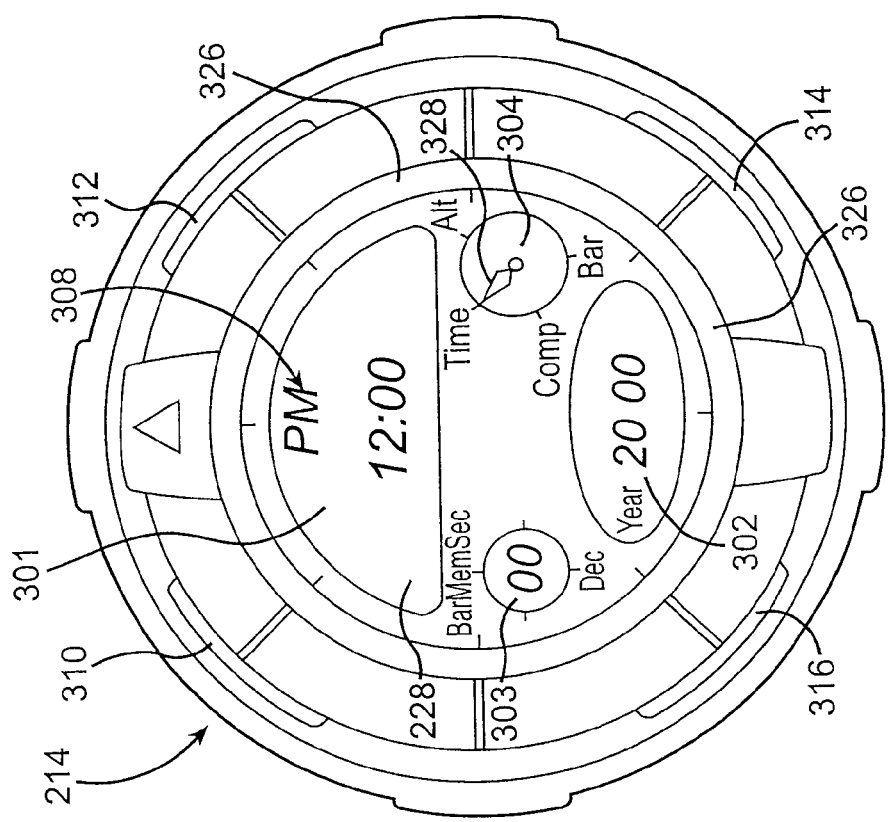
FIG. 17 is a front view of the LCD face of the multi-function module, shown in default mode, displaying the time and date set function.
Figure 16:
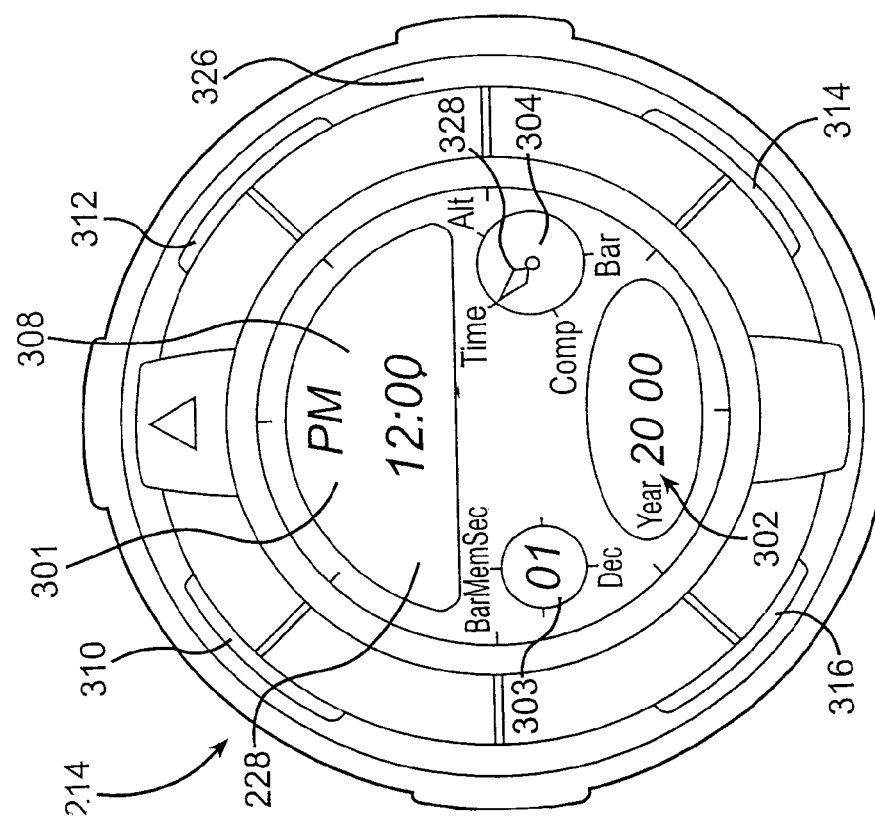
FIG. 16 is a front view of the LCD face of the multi-function module, shown in default mode, displaying time and year.

FIG. 17 shows face 308 in clock/date set function mode. Upon entry into clock/date set function, AM/PM designation flashes on zone 301. The procedure for setting time and date is as follows:

- Depressing button 310 or button 316 toggles the AM/PM designation between "AM" and "PM". Depressing select/set button 314 causes the hour designation to flash in zone 301. Depressing and releasing button 310 or button 316 increases or decreases the hour in one hour increments. Faster scrolling of hours can be accomplished by depressing and holding button 310 or button 316.
- Depressing select/set button 314 again causes the minute designation to flash in zone 301. Depressing button 310 or button 316 increases or decreases minutes in one minute increments. Faster scrolling of minutes can be accomplished by depressing and holding button 310 or button 316.
- Depressing select/set button 314 again causes the year designation to flash in zone 302. Depressing button 310 or button 316 increases or decreases the year in one year increments. Faster scrolling of years can be accomplished by depressing and holding button 310 or button 316.

Depressing select/set button 314 again causes the date (mm.dd) to be displayed in zone 302 and the month designation to flash. Depressing button 310 or button 316 increases or decreases the month in one month increments. Faster scrolling of months can be accomplished by depressing and holding button 310 or button 316.

Depressing select/set button 314 again causes the day designation to flash in zone 302. Depressing button 310 or button 316 increases or decreases the day in one month increments. Faster scrolling of days can be accomplished by depressing and holding button 310 or button 316.

Depressing select/set button 314 once again returns the user to AM/PM set mode.

Depressing button 312 at any time while in Clock/Date Set Function returns LCD 228 to Default Mode (FIG. 14).

Alarm Set Function

Figure 18:
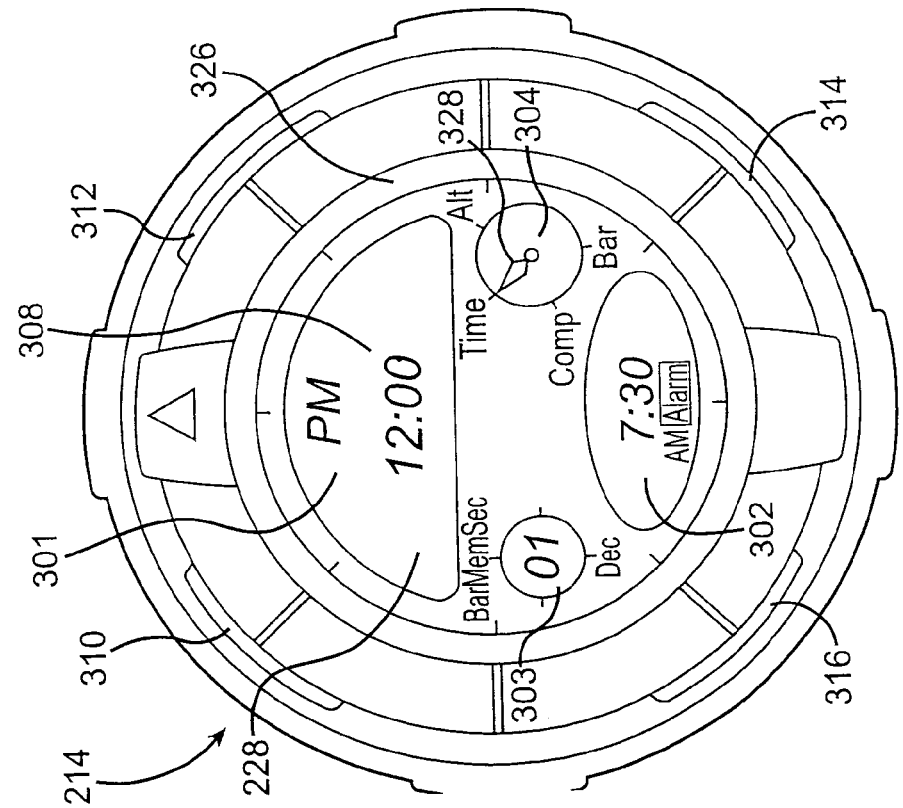
FIG. 18 is a front view of the LCD face of the multi-function module, shown in default mode, displaying the alarm set function.

The alarm set function of face 308 is shown in FIG. 18. Upon activation of the alarm set function, the hour designation will begin flashing on zone 302 and a box will appear around the word "Alarm". The procedure for setting the alarm is as follows:

Depressing and releasing button 310 or button 316 increases or decreases the flashing hour designation in one hour increments. Faster scrolling of hours can be accomplished by depressing and holding button 310 or button 316.

Depressing select/set button 314 causes the minute designation to flash in zone 302. Depressing button 310 or button 316 increases or decreases minutes in one minute increments. Faster scrolling of minutes can be accomplished by depressing and holding button 310 or button 316.

Depressing button 312 at any time while in Alarm Set Function returns LCD 228 to Default Mode (FIG. 14).

Stopwatch Function

Figure 19:
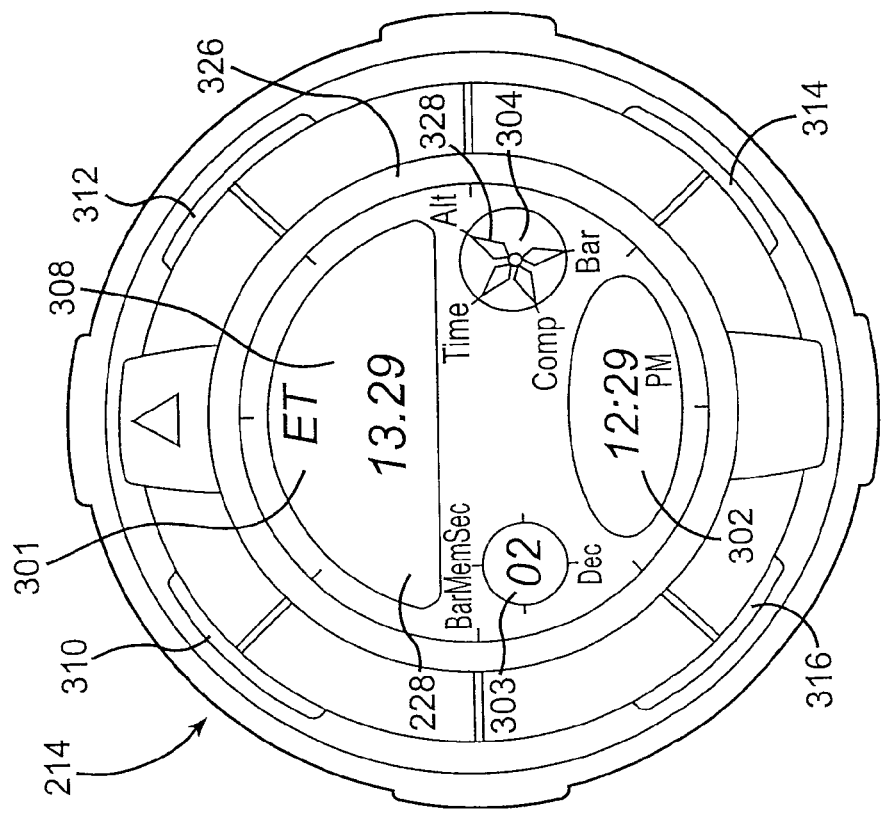
FIG. 19 is a front view of the LCD face of the multi-function module, shown in default mode, displaying the stopwatch function.

The stopwatch function of LCD 228 is shown in FIG. 19. As described above, the stopwatch function is activated from time mode by depressing and holding button 310 for 2 seconds. When the stopwatch function is active, face 308 displays the following information:

| | |
|---|---|
| Zone 301: | displays "ET" and elapsed time in minutes and seconds in mm.ss format. |
| Zone 302: | displays current time in hh:mm format, along with "AM" or "PM" if in 12-hour time format. |
| Zone 303: | displays elapsed time in hours. |
| Zone 304: | arrow 328 rotates to indicate that the stopwatch has been started. |

The stopwatch function is operated as follows:

Depressing button 310 starts elapsed time running, depressing button 310 again stops elapsed time, depressing button 310 a third time restarts elapsed time.

Depressing button 316 resets elapsed time to zero.

Depressing select/set button 314 returns LCD 228 to default display mode (FIG. 14).

Low Battery Feature

Figure 20:
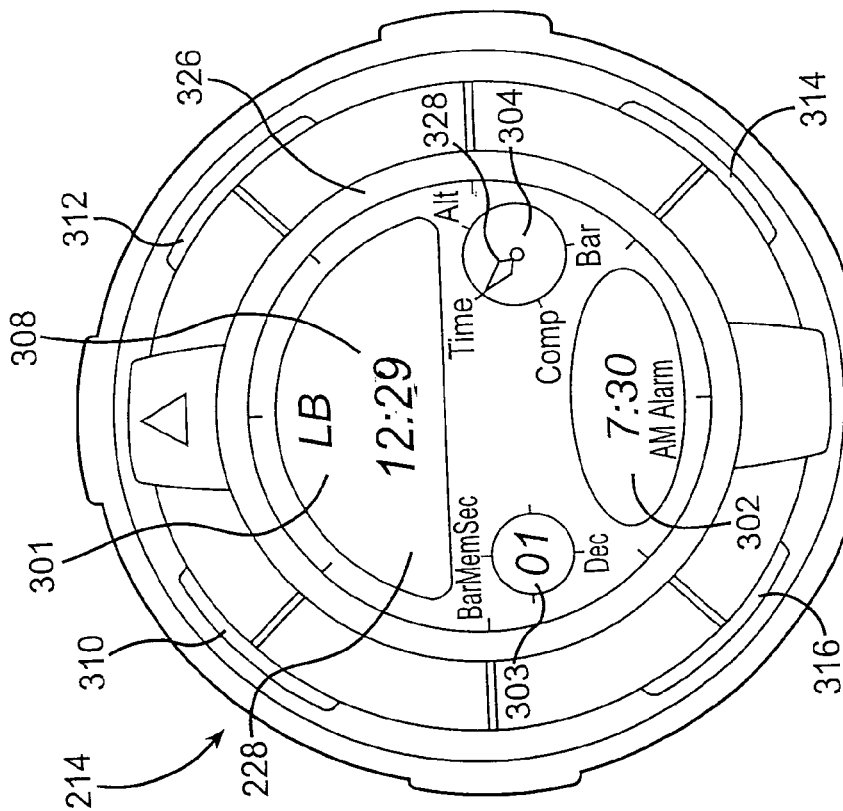
FIG. 20 is a front view of the LCD face of the multi-function module, shown in default mode; displaying time and alarm information and the "low battery" indicator.

When battery 244 nears full discharge (for example, 10% of original charge remaining), AM/PM designation will flash and alternate between "AM" or "PM" and "LB" (see FIG. 20).

Compass Mode

Figure 21:
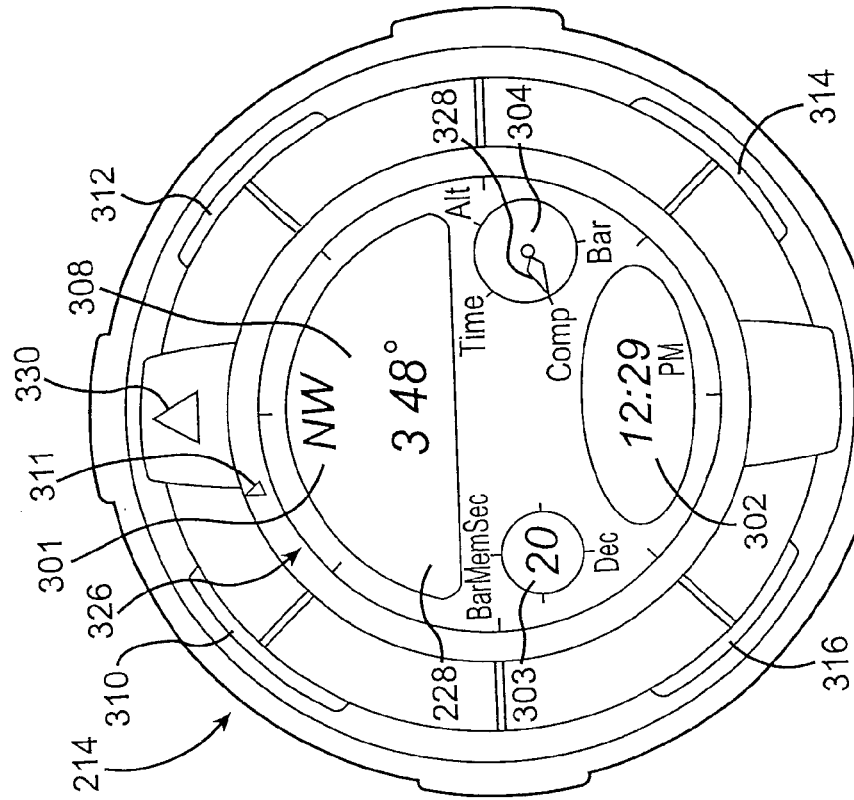
FIG. 21 is a front view of the LCD face of the multi-function module, shown in compass mode, displaying direction and declination.

FIG. 21 shows LCD 228 in compass mode. In compass mode, face 308 displays the following information:

| | |
|---|---|
| Zone 301: | displays a numerical reading from 0 degrees to 360 degrees, indicating the direction arrow 330 is facing (with 0 degrees equaling due North), along with a two-letter directional designation (N, NE, E, SE, S, SW, W, or NW). |
| Zone 302: | displays the current time in hours and minutes and an AM/PM designation if in 12-hour time format. |
| Zone 303: | displays declination reading (i.e., the angle that would be formed between the needle of a mechanical compass and a line pointing due North) and an indicator line that shows whether the declination angle is to the East or West of due North. |
| Ring 326: | displays an arrow 311 which is a graphical representation of the numerical reading on zone 301. |

Operation When Default Display is Active

Figure 22:
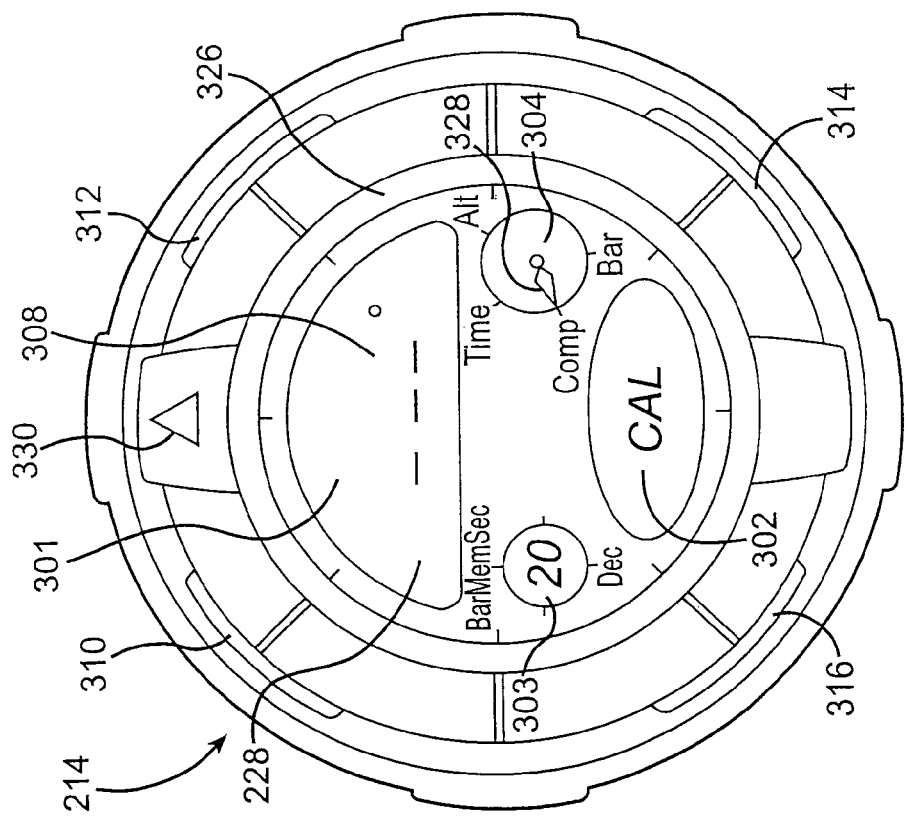
FIG. 22 is a front view of the LCD face of the multi-function module, shown in compass mode, displaying the compass set function.

Depressing and holding select/set button 314 for 3 seconds activates the compass calibration function (FIG. 22).

Compass Calibration Function

Upon entry into Compass Calibration Function, place holders will be flashing on zone 301 and the letters "CAL" will be displayed in zone 302.

Depressing select/set button 314 causes the place holders to be replaced by a flashing numerical reading "0 00" and an arrow to appear in ring 326

Depressing select/set button 314 again begins calibration (numerical reading "0 00" will stop flashing). To calibrate, keep compass 220 level and rotate it 360 degrees. During rotation of compass 220, arrows will appear in ring 326 will rotate 360 degrees and the numerical reading will change. When compass 220 has been rotated 360 degrees, all arrows in ring 326 will be lit and the numerical reading will flash.

Depressing and releasing select/set button 314 changes LCD 228 to declination calibration mode, causing the numbers in zone 303 to flash. Depressing button 310 or button 316 will respectively increase or decrease the declination reading. When declination reading is at the desired number, select/set button 314 is depressed to return to compass display mode.

Altimeter Mode

FIG. 23 shows LCD 228 in altimeter mode, in which face 308 displays the following information:

| | |
|---|---|
| Zone 301: | displays current altitude above (or below) sea level in feet when in English units mode ("FT" is also displayed) or meters when in metric mode ("M" is displayed). The range and accuracy of the altimeter is from −500 feet to +15,000 feet in 10 foot increments or −160 meters to +4575 meters in 5 meter increments. When current altitude is greater than 9,999 feet, the first two numbers of the current altitude are displayed at the top of zone 301. |
| Zone 302: | displays the current time in hours and minutes and "AM" or "PM" if in 12-hour time format. |
| Zone 303: | displays the rate of change in altitude in feet per minute or meters per minute. If altitude is increasing, an upward pointing arrow is displayed. If altitude is decreasing, a downward pointing arrow (not shown) is displayed. |

Figure 24:
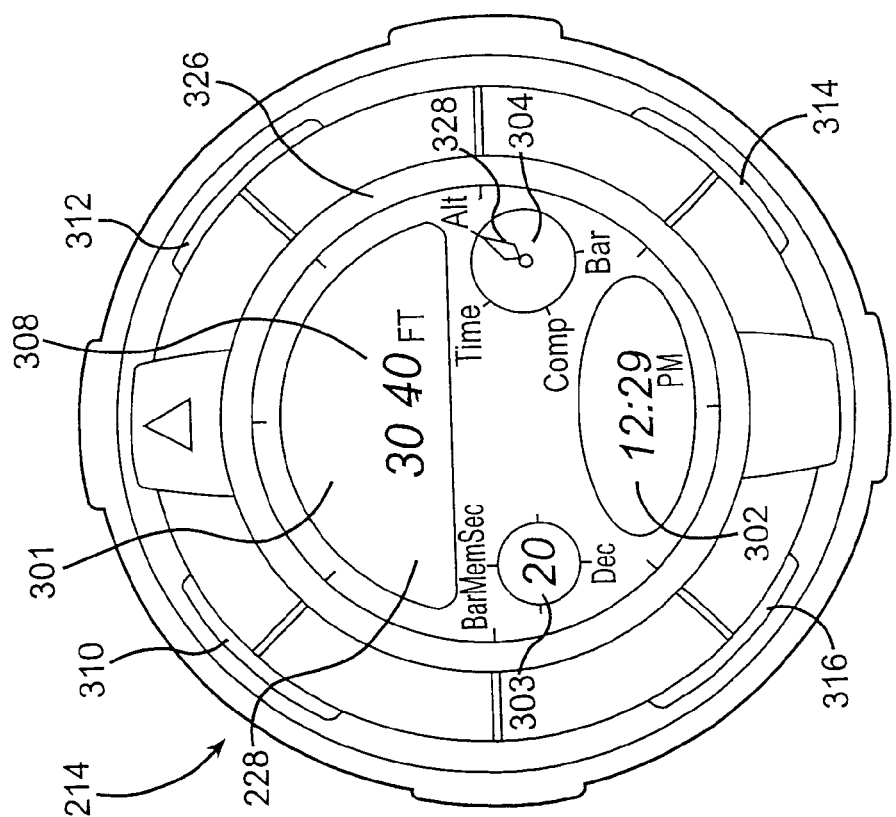
FIG. 24 is a front view of the LCD face of the multi-function module, shown in altitude mode, displaying the altitude set function.
Figure 27:
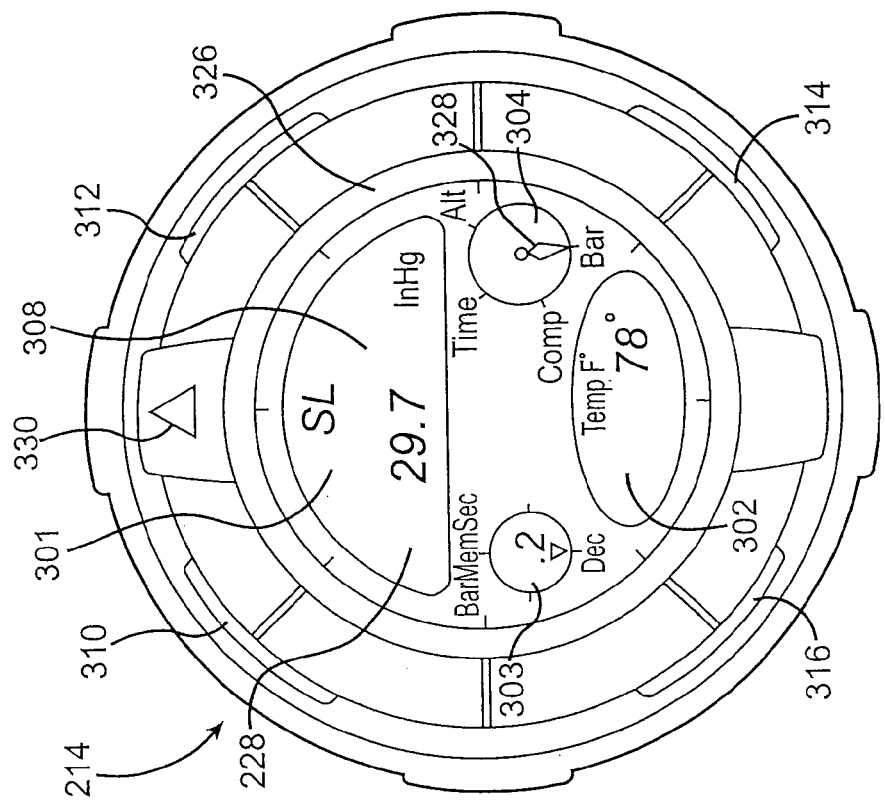
FIG. 27 is a front view of the LCD face of the multi-function module, shown in barometer mode, displaying sea level barometric pressure, temperature and rate of change in barometric pressure in English units.

Operation in Altimeter Mode
  Depressing and releasing button 310 toggles the LCD 228 between English and Metric units.
  Depressing and holding button 310 for 3 seconds changes LCD 228 to altitude set function (see FIG. 24).

Altimeter Set Function
  Accurate calibration of current altitude requires the user to know his or her actual current altitude. Upon entry into Altimeter Set Mode, current altitude reading will flash. Buttons 310 and 316 are used to respectively increase or decrease the current altitude until it equals the known actual current altitude.
  A less accurate method of setting the current altitude is to set the sea level pressure in Barometer mode (described herein) to a known value (that can be obtained from a current weather report). Setting the current altitude in this manner will be accurate to within a few hundred feet.

Figure 25:
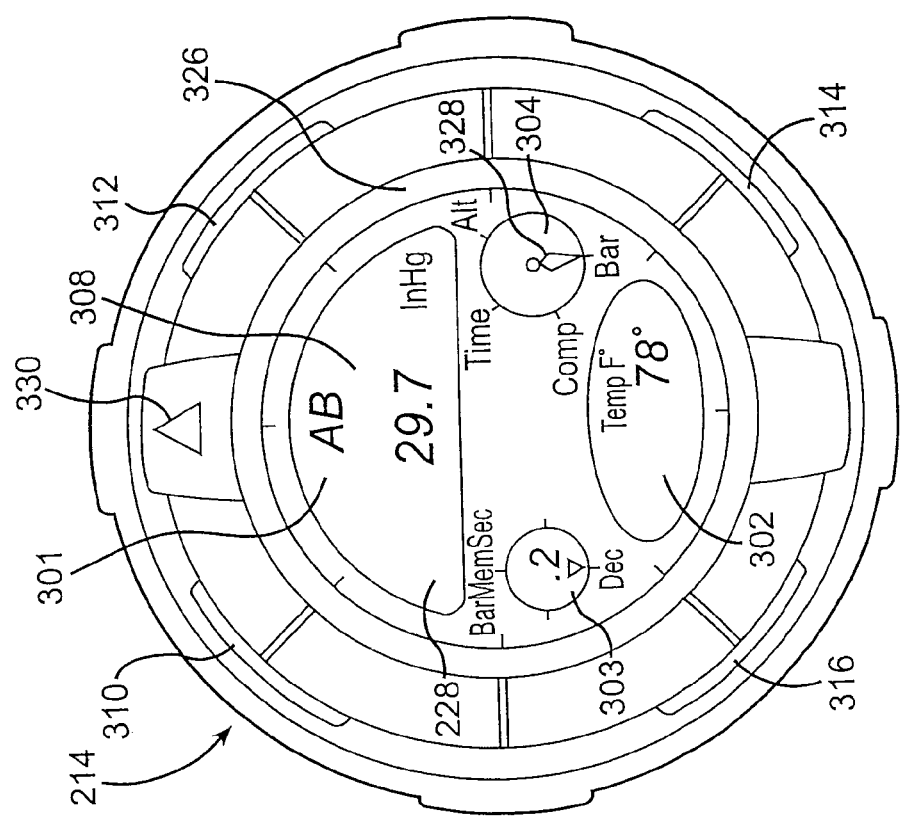
FIG. 25 is a front view of the LCD face of the multi-function module, shown in barometer mode, displaying absolute barometric pressure, temperature and rate of change in barometric pressure in English units.
Figure 26:
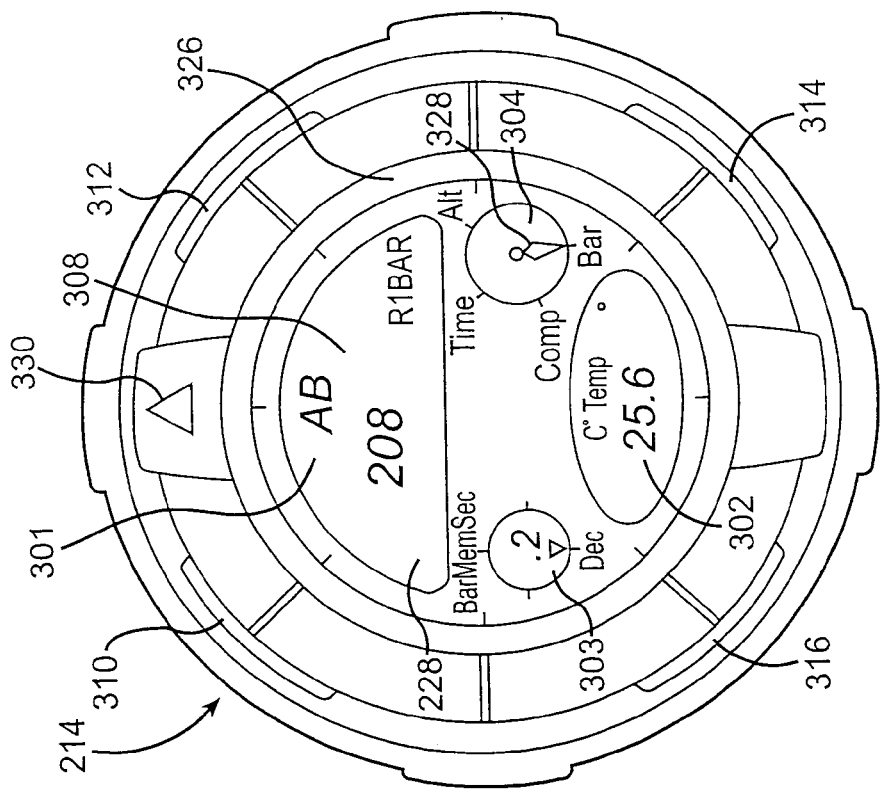
FIG. 26 is a front view of the LCD face of the multi-function module, shown in barometer mode, displaying absolute barometric pressure, temperature and rate of change in barometric pressure in metric units.
Figure 28:
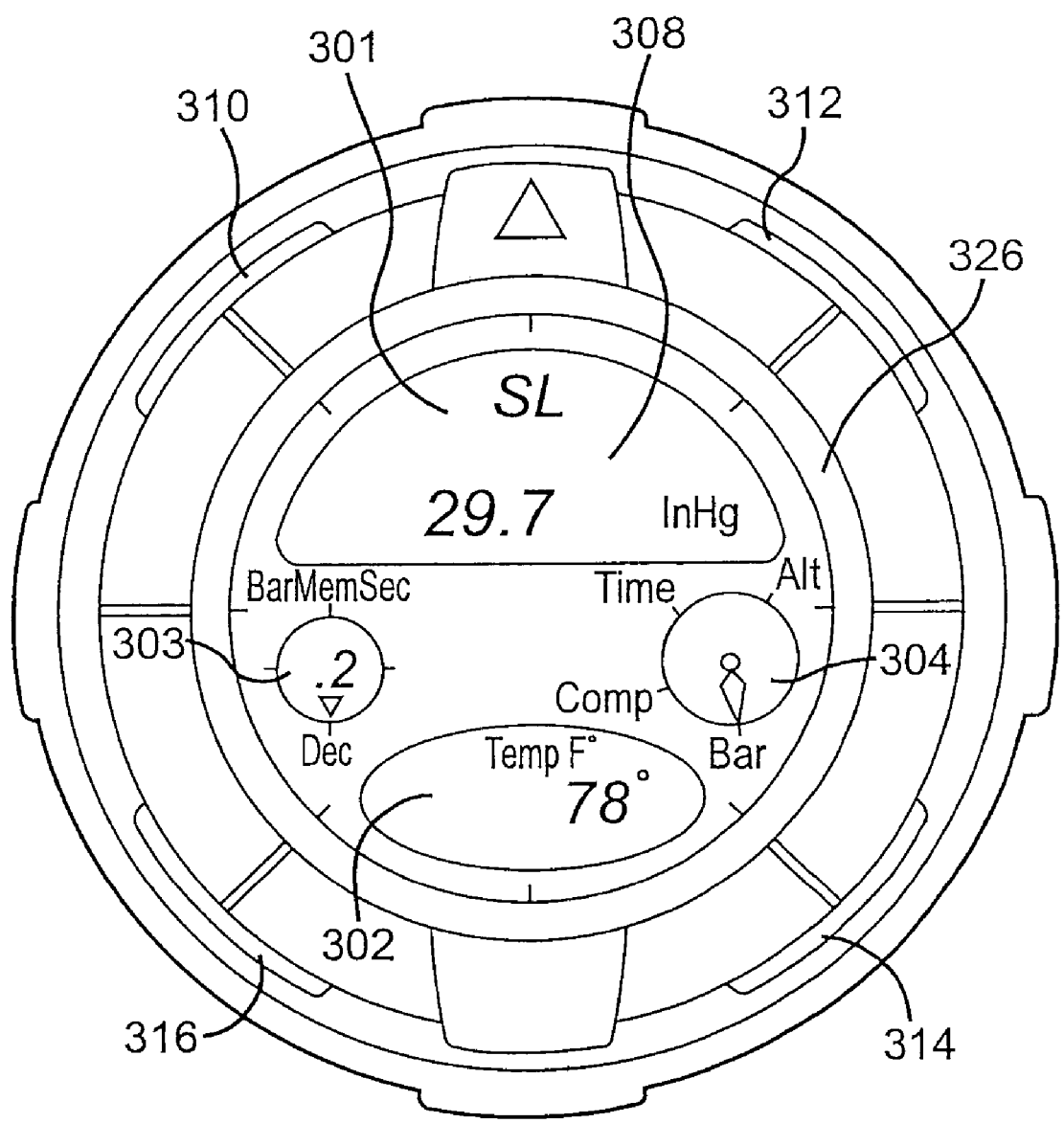
FIG. 28 is a front view of the LCD face of the multi-function module, shown in barometer mode, displaying the barometric pressure set function.

Barometer Mode (FIGS. 29–32)
  FIGS. 25–26 shows LCD 228 in barometer mode, which includes the following information:

| Zone 301: | displays the absolute barometric pressure in inches of Mercury (Hg) or in millibars (mbar) and the letters "AB" appear above the pressure reading. The usable pressure range is 10.0 Hg to 32.4 Hg or 338 mbar to 1095 mbar. |
| --- | --- |
| Zone 302: | displays current temperature in °F. or °C., the usable temperature range being from −5° F. to +140° F. or −20° C. to +60° C. |
| Zone 303: | displays the amount of change in pressure (in units equal to the present pressure reading in Zone 301) since the last pressure reading taken by the on-board sensor (not shown). |

LCD 228 is operated in barometer mode as follows:
  Depressing and releasing button 310 toggles zones 301, 302 and 303 between English units (see FIG. 25) and metric units (see FIG. 26).
  Depressing and releasing select/set button 314 changes LCD 228 to sea level barometric pressure display mode.
  Depressing and holding select/set button 314 for 3 seconds changes LCD 228 to sea level barometric pressure set mode.

Sea Level Barometric Pressure Set Function

| Zone 301: | displays the relative barometric pressure (equal to the difference between the absolute barometric pressure and sea level barometric pressure) and the letters "SL" above the pressure reading. |
| --- | --- |

Calibrating the barometric pressure is accomplished as follows:
  Calibrating the barometric pressure requires the user to know the actual current barometric pressure at sea level, which can be found in many weather reports.
Upon entering this mode, the pressure reading in zone 301 will flash. To calibrate, button 310 or button 316 is depressed to respectively increases or decreases the pressure reading until the pressure reading equals the actual current barometric pressure at sea level. Depressing select/set button 314 fixes the pressure reading and returns LCD 228 to sea level barometric pressure mode.

CONCLUSION

It is clear from the above that the objects of the invention have been fulfilled.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable persons who are not familiar with Patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills al the objects of the invention. It is to be understood, however, that the disclosure is by way of illustration only and that the scope of the invention is to be limited solely by the following claims:

We claim as our invention:
1. Multi-purpose equipment, comprising:
  a housing;
  a module removably secured to said housing, said module adapted to contain an electronic or mechanical device;
  at least one folding tool attached to said housing and disposed within a tool receiving cavity having a first volume; and
  an accessory compartment located within said housing, said accessory compartment being sized and shaped to removably retain a conventional disposable lighter therein, and said accessory compartment having a second volume on the same order of magnitude as the first volume.
2. The multi-purpose equipment of claim 1, wherein said accessory compartment further comprises an opening adapted to receive said conventional disposable lighter therethrough.
3. The multi-purpose equipment of claim 2, wherein said housing further comprises a lid, said lid having a closed position wherein said lid covers said opening to protect said conventional disposable lighter and an open position wherein said opening is unobstructed so as to enable removal and insertion of said conventional disposable lighter from and to said accessory compartment.
4. The multi-purpose equipment of claim 1, wherein said device comprises a mechanical compass.
5. The multi-purpose equipment of claim 1, wherein said device comprises a multi-function electronic device.
6. The multi-purpose equipment of claim 5, wherein said multi-function electronic device comprises a digital watch.
7. The multi-purpose equipment of claim 5, wherein said multi-function electronic device comprises a digital compass.
8. The multi-purpose equipment of claim 7, wherein said multi-function electronic device further comprises a digital thermometer.
9. The multi-purpose equipment of claim 7, wherein said multi-function electronic device further comprises a digital barometer.

10. The multi-purpose equipment of claim 7, wherein said multi-function electronic device further comprises a digital altimeter.

11. The multi-purpose equipment of claim 5, wherein said multi-function electronic device comprises a stud-finder.

12. The multi-purpose equipment of claim 5, wherein said multi-function electronic device comprises a global positioning system receiver.

13. The multi-purpose equipment of claim 5, wherein said multi-function electronic device comprises a range finder and calculator.

14. The multi-purpose equipment of claim 5, wherein said multi-function electronic device comprises a wireless telephone.

15. The multi-purpose equipment of claim 5, wherein said multi-function electronic device comprises a radio transmitter/transponder.

16. The multi-purpose equipment of claim 1, wherein said module is generally cylindrical, and wherein said housing includes a front face having a generally cylindrical module-receiving cavity positioned on a major portion thereof for removably receiving said module therein.

17. The multi-purpose equipment of claim 16, wherein said housing includes a top, a bottom, and sides, said module being slightly tapered inwardly along said sides from said top to said bottom.

18. The multi-purpose equipment of claim 17, wherein said front face of said housing further includes an upper portion nearer said top and a lower portion nearer said bottom, said module-receiving cavity formed in said upper portion of said housing.

19. The multi-purpose equipment of claim 18, wherein said housing further includes a rear face that is substantially parallel to and spaced rearwardly from said front face, said rear face including a belt clip fastened thereto.

20. The multi-purpose equipment of claim 18, wherein said housing further includes a flashlight positioned on said lower portion of said front face.

21. The multi-purpose equipment of claim 18, wherein said housing further includes a tool pod positioned on one of said sides of said housing, said tool pod comprising a plurality of tools pivotally mounted thereon including said at least one folding tool.

22. The multi-purpose equipment of claim 21, wherein said plurality of tools comprises one or more tools selected from the group consisting of: a knife, a screwdriver, a can opener, a corkscrew, and a scissors.

23. The multi-purpose equipment of claim 1, further comprising a lanyard coupling said module to said housing.

24. The multi-purpose equipment of claim 16, further comprising a lanyard coupling said module to said housing.

25. Multi-purpose equipment, comprising:
a housing having a front face and a side portion;
a module removably secured to a major portion of said front face, said module adapted to contain an electronic or mechanical device, said electronic device being electronically self-contained within said module;
a tool pod located on said side portion of said housing, said tool pod having at least one tool attached thereto and pivoting about a rotational axis; and
an accessory compartment located within said housing, said accessory compartment being sized and shaped to removably retain a conventional disposable lighter therein and including an opening adapted to receive said conventional disposable lighter therethrough.

26. The multi-purpose equipment of claim 25, wherein said housing further includes a module receiving cavity on said front face for removably receiving said module, said module receiving cavity having a central axis, said rotational axis of said tool being substantially parallel to said central axis.

27. The multi-purpose equipment of claim 25, wherein said housing further comprises a lid, said lid having a closed position wherein said lid covers said opening to protect said conventional disposable lighter and an open position wherein said opening is unobstructed so as to enable removal and insertion of said conventional disposable lighter from and to said accessory compartment.

28. The multi-purpose equipment of claim 27, wherein said device comprises a mechanical compass.

29. The multi-purpose equipment of claim 25, wherein said device comprises a multi-function electronic device.

30. The multi-purpose equipment of claim 29, wherein said multi-function electronic device comprises a digital watch.

31. The multi-purpose equipment of claim 29, wherein said multi-function electronic device comprises a digital compass.

32. The multi-purpose equipment of claim 31, wherein said multi-function electronic device further comprises a digital thermometer.

33. The multi-purpose equipment of claim 31, wherein said multi-function electronic device further comprises a digital barometer.

34. The multi-purpose equipment of claim 31, wherein said multi-function electronic device further comprises a digital altimeter.

35. The multi-purpose equipment of claim 25, wherein said at least one tool is selected from the group consisting of: a corkscrew, a knife blade, a bottle opener, a can opener, a saw blade, a pair of scissors, a Phillips-head screwdriver, and a flat-head screwdriver.

36. The multi-purpose equipment of claim 26, wherein said module is generally cylindrical, and wherein said housing includes a top and a bottom.

37. The multi-purpose equipment of claim 36, wherein said front face of said housing further includes an upper portion nearer said top and a lower portion nearer said bottom, said module-receiving cavity formed in said upper portion of said housing.

38. The multi-purpose equipment of claim 25, wherein said housing further includes a rear face that is substantially parallel to and spaced rearwardly from said front face, said rear face including a belt clip fastened thereto.

39. The multi-purpose equipment of claim 37, wherein said housing further includes a flashlight positioned on said lower portion of said front face.

40. The multi-purpose equipment of claim 25, wherein said housing further includes a tool pod positioned on said side portion of said housing, said tool pod comprising a plurality of tools pivotally mounted thereon including said at least one tool.

41. Multi-purpose equipment, comprising:
a housing having a front face and a side portion;
a module removably secured to a major portion of said front face, said module adapted to contain an electronic or mechanical device, said electronic device being electronically self-contained within said module;
a tool pod located on said side portion of said housing, said tool pod having at least one tool attached thereto and pivoting about a rotational axis; and
a lanyard coupling said module to said housing.

* * * * *